(12) United States Patent
Rapelje

(10) Patent No.: US 12,082,569 B1
(45) Date of Patent: Sep. 10, 2024

(54) FISHING LURE SYSTEMS

(71) Applicant: Donald G. Rapelje, Sequim, WA (US)

(72) Inventor: Donald G. Rapelje, Sequim, WA (US)

(*) Notice: Subject to any disclaimer, the term of this patent is extended or adjusted under 35 U.S.C. 154(b) by 27 days.

(21) Appl. No.: 18/128,225

(22) Filed: Mar. 30, 2023

(51) Int. Cl.
*A01K 85/00* (2006.01)

(52) U.S. Cl.
CPC ...... *A01K 85/1851* (2022.02); *A01K 85/1811* (2022.02)

(58) Field of Classification Search
CPC ............ A01K 85/1837; A01K 85/1811; A01K 85/1851; A01K 85/1857
USPC .............................................. 43/42.24, 42.39
See application file for complete search history.

(56) References Cited

U.S. PATENT DOCUMENTS

| | | | | |
|---|---|---|---|---|
| 3,724,117 A * | 4/1973 | Flanagan, Jr. | ......... | A01K 85/14 43/42.32 |
| 3,868,784 A * | 3/1975 | Sabol | ..................... | A01K 85/16 43/42.3 |
| 5,070,639 A * | 12/1991 | Pippert | .................. | A01K 85/01 43/42.31 |
| 5,491,927 A * | 2/1996 | Ortiz | ....................... | A01K 85/00 43/42.39 |
| 7,497,046 B1 * | 3/2009 | Jefferson | ................ | A01K 85/00 43/44.4 |
| 9,253,966 B2 * | 2/2016 | Scholfield | .............. | A01K 85/01 |
| 10,398,135 B1 * | 9/2019 | Morales | ................. | A01K 85/02 |
| 11,716,978 B1 * | 8/2023 | Mongold | ............... | A01K 85/00 43/42.43 |
| 2006/0117642 A1 * | 6/2006 | Huddleston | ............ | A01K 85/00 43/42.39 |
| 2010/0115822 A1 * | 5/2010 | Huddleston | ............ | A01K 85/02 43/42.15 |
| 2014/0259869 A1 * | 9/2014 | Scholfield | .............. | A01K 85/00 43/44.9 |
| 2015/0128478 A1 * | 5/2015 | Huddleston | ............ | A01K 85/02 43/42.39 |
| 2023/0107358 A1 * | 4/2023 | Trammell | .............. | A01K 85/18 43/42.08 |

* cited by examiner

*Primary Examiner* — Christopher P Ellis
(74) *Attorney, Agent, or Firm* — Puget Sound Patents; Dwayne E Rogge

(57) ABSTRACT

A fishing lure system with an example having a two-part fishing lure having a replaceable hook-retainer carriage assembly which is removably insertable in an elastomeric body component. When configured as a two-part lure, the fishing lure may be configured with a flexible elastomeric body component with a precisely positioned preformed cavity in the head region for receiving a weighted hook-retainer carriage. The carriage may be inserted into the lure through a slit or passageway. The elastomeric bodies, hooks and weighted carriage assemblies of one example are independently removable and replaceable. The carriage assembly of one example includes an integral hook eye retaining loop and hook shank retainers which exit through passageways from the preformed cavity to the dorsal surface of the elastomeric body. The eyelet and retainers may be configured to position an upward pointing hook that is removably secured adjacent the outside dorsal surface of the lure.

10 Claims, 13 Drawing Sheets

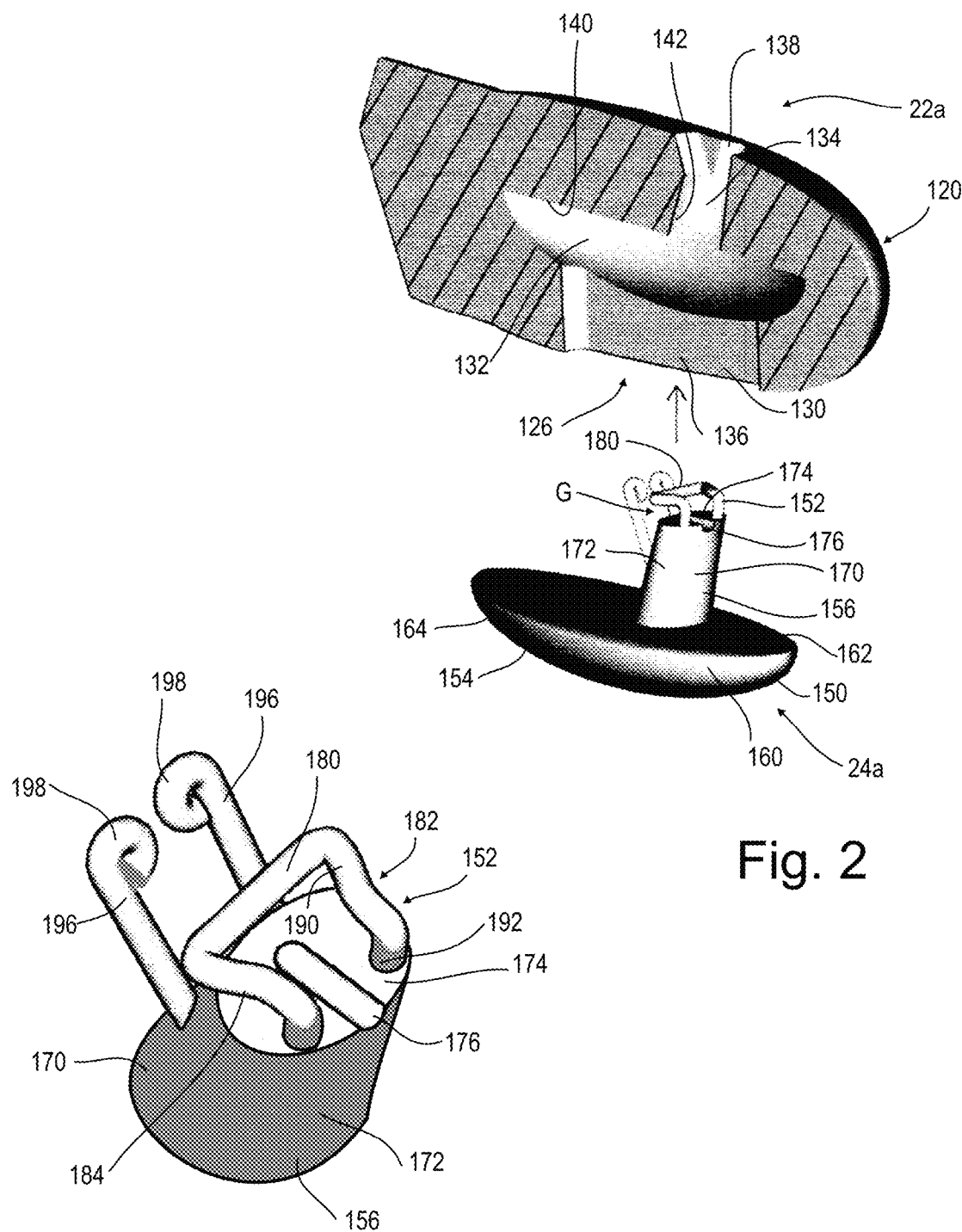

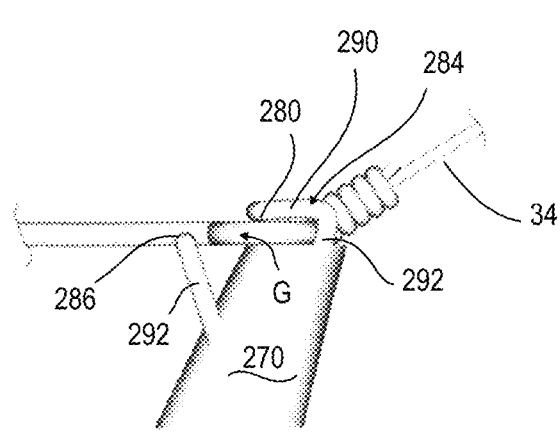
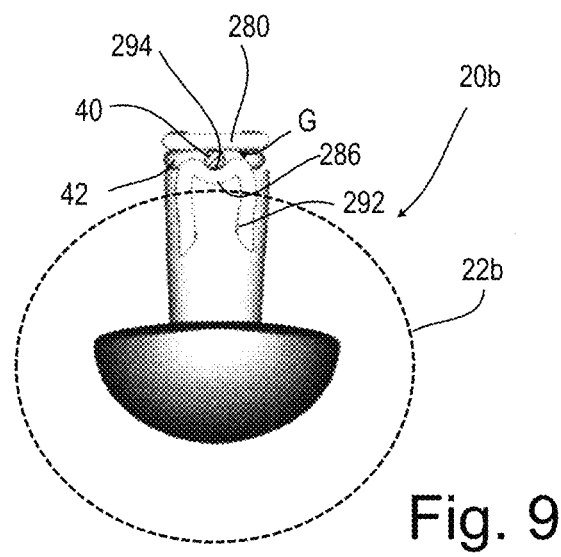
Fig. 8    Fig. 9
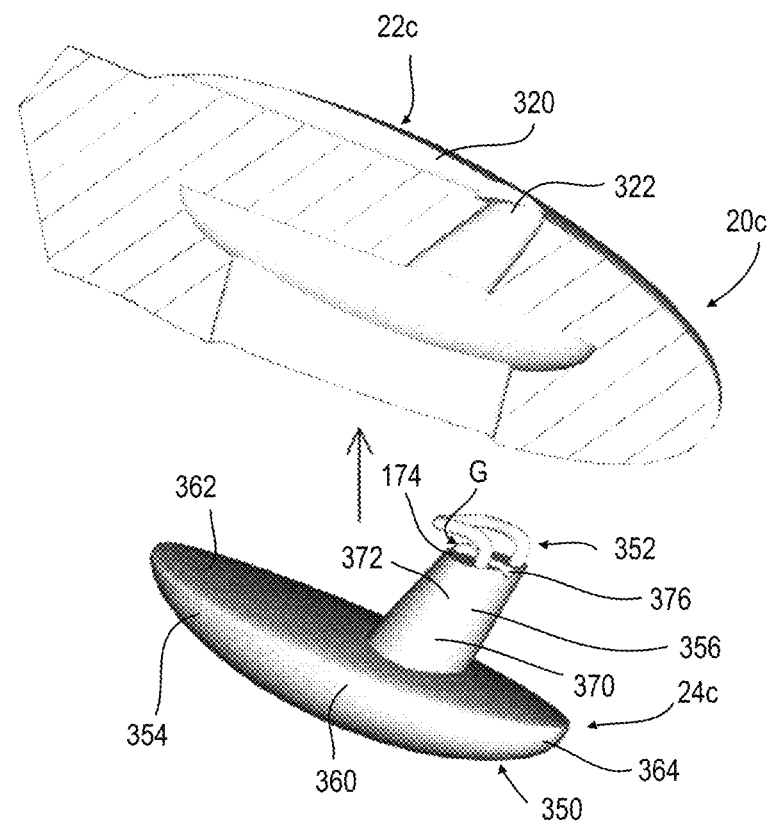
Fig. 10

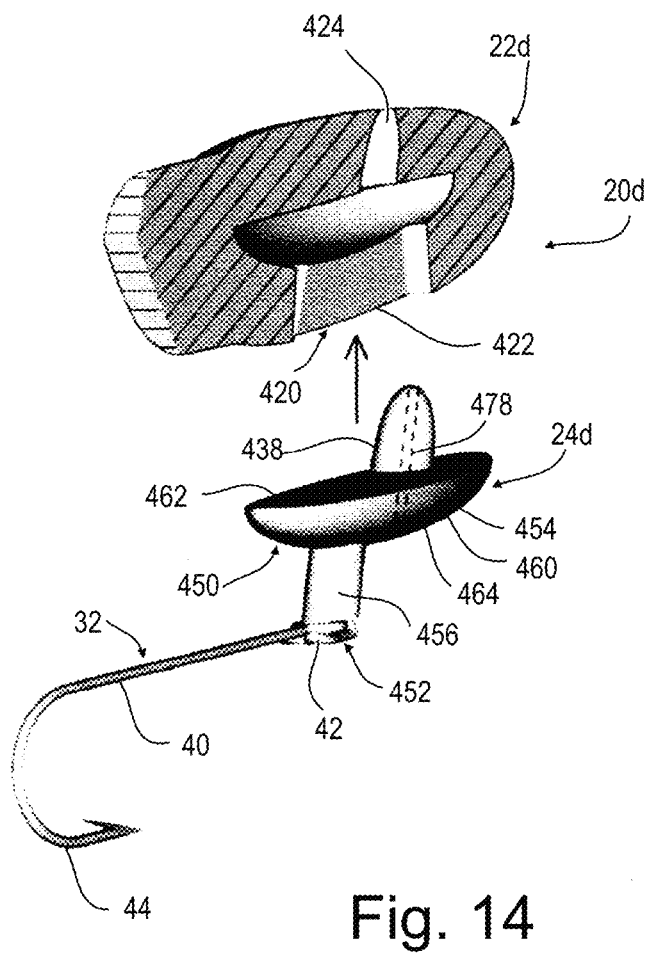

FISHING LURE SYSTEMS

BACKGROUND OF THE DISCLOSURE

Field of the Disclosure

The disclosed apparatus relates to fishing lures and, more specifically, to fishing lures having elastomeric body members configured to simulate the natural swimming motion of a baitfish when fishing for game fish.

Background

Anglers and manufacturers of fishing lures have discovered that elastomeric or other soft plastic materials, such as for example fishing lures comprising worm plastisol, provide swimming mechanics that appeal to some predatory fish. For this reason, many commercially available elastomeric fishing lures are constructed having a body consisting of a solid homogeneous mass of supple/soft material into which is embedded one or more hooks and/or weights. A very common construction of such traditional soft swimbaits involves permanently casting a jig head (a hook cast into a weight) into an elastomeric body.

Some of these soft swimbaits are constructed with an internal wire harness and a weight permanently cast inside the supple body. With these designs, a separate hook may be removably secured to a wire eyelet extending out from the external surface of the lure body. Because the weight and harness are permanently cast into the soft body, if the supple body is damaged, the weight and the harness are of little use and are usually disposed of along with the soft body. With prior known devices, attaching a hook to the harness eyelet often requires use of a split-ring or closable open-eye hook. In such designs, the hook will not release from the lure's eyelet when it is struck (bitten) by a fish and thus hooked to the fish.

When such a jig head or weight are permanently cast inside the soft body, a large volume of supple, flexible material is required to prevent hooks and weights from tearing the much softer body in use. Applicant has discovered that this large volume of supple material creates friction and an unrealistically large bow wave, giving the lure an un-natural pitch and roll when moving through the water. Energy to flex the lure body in a simulated swimming motion is usually generated with a baffle at the rear of the flexible body. However, with a large forward volume of elastomer required to contain a jig head or hook, flexing is usually limited to the rear one-third of the lure.

Applicant has discovered that a large supple body mass also requires more weight to compensate for pitch and roll when the lure is pulled through the water. Greater weight will cause the lure to drop through the water column at a faster rate and quickly pass through a fish's "strike zone" or the water depth where a fish is most likely to strike a lure. Soft swimbaits can be made more durable by increasing the hardness of elastomeric material, but this will decrease flexibility and reduce life-like swimming motion.

Further, for soft swimbait lures having a hook and/or weight permanently embedded inside the supple body material, an angler is unable to replace hooks or weights if bodies age or become damaged. When torn or otherwise damaged, the supple body portion is usually disposed of, leaving an unusable weight or jig head. Jig heads with dull, damaged hooks or rusted hooks are normally useless and the weight must be disposed of in an environmentally safe manner, often being made with or of lead. Many lures are damaged/ lost by hard fighting fish or sharp teeth. Fishing lures are also frequently lost when they are snagged on underwater structures like rocks, tree limbs, or stumps. A common weight of choice for most weighted lures is lead, a toxic heavy metal which is undesired in aquatic environments, landfills, etc. Lead is becoming a serious environmental concern, with an increasing number of jurisdictions banning fishing tackle containing the metal.

Although many different designs are known, horizontal eyed hooks are the most common type of fishing lures. Such a hook is shown in FIG. 1 in use on one example of the disclosed fishing lure system.

Accordingly, the applicant has discovered there is an unmet need in the field of fishing lures for a weighted carriage with spring wires bent into configurations that will allow a hook to be released from the lures when struck by a fish while still maintaining a direct connection to fishing line. Bent wires on the carriage are formed so they may maintain a hook shank vertically adjacent to either the dorsal or ventral surface of the lure body and maintain the hook in axial alignment with the backbone axis of the lure.

RELATED ART

U.S. Pat. No. 9,538,735 to Rider discloses a hook clasp with double bent wires having a spring-loaded configuration for retaining a fishhook on a lure or a jig head. Although the hook may be disconnected from the lure, the hook is not released when struck by a fish. Springs require substantial pressure to move the hook clasp to an open position. The hook clasp comprises a combination of an elongated shank and a spring wire clasp in order to capture a hook. In this Rider patent, springs are not permanently cast into a weight. A hook is loosely held like a link in a chain without means for keeping it aligned along the backbone axis, both vertically and laterally (transversely).

U.S. Pat. No. 5,884,430 to Livingston discloses a bent spring wire assembly for maintaining a first hook and a second hook connected in tandem in axial alignment. While allowing a rearward hook to be released from the connection for replacement, it will not be released when struck by a fish. Livingston only describes fishing line attached at a forward point, not to a hook eye.

U.S. Pat. No. 8,904,700 to Kacines discloses a fishing lure having an internal cavity with a magnetically releasable hook mechanism inside the cavity. A hook is released from the lure by a magnet sliding down the fishing line where the magnet attracts an internal shaft that releases the eye of a fishhook. This construction requires a magnet, which adds complexity and costs of manufacture. Hooks are releasable but are not attached directly to a fishing line, so if a hook is released by a fish or snag, it is lost.

BRIEF SUMMARY OF THE DISCLOSURE

Disclosed herein are examples of a lure system configured to be used with a fish line and a fishhook. In this example, the lure system comprises a body member defining a carriage passageway and a carriage assembly. The carriage assembly comprises a carriage member defining a distal surface portion and a retaining member defining a main portion. The retaining member is supported by the carriage member such that a gap is defined between the main portion of the retaining member and the distal surface portion of the carriage member. The carriage member is supported by the body member such that the distal surface portion of the carriage member extends out of or is accessible within the carriage passageway. The fishhook is arranged at least partly within the gap defined between the main portion of the retaining member and the distal surface portion of the carriage member such that the fishhook is supported in a desired orientation relative to the body member.

Disclosed herein are examples including a method of forming a fishing system including a lure system, a fish line, and a fishhook comprising the following steps. A body member defining a carriage passageway is provided. A carriage assembly is provided. The carriage assembly comprises a carriage member defining a distal surface portion and a retaining member defining a main portion. The retaining member is supported by the carriage member such that a gap is defined between the main portion of the retaining member and the distal surface portion of the carriage member. The body member is deformed, and the carriage member is inserted into the carriage passageway such that the carriage member is supported relative to the body member such that the distal surface portion of the carriage member extends out of or is accessible within the carriage passageway. The fishhook is arranged at least partly within the gap defined between the main portion of the retaining member and the distal surface portion of the carriage member such that the fishhook is supported in a desired orientation relative to the body member.

Disclosed herein are examples which may also be embodied as a fishing system comprising a fishing line, a fishhook, and a lure system. The lure system of one example comprises a body member defining a carriage passageway and a carriage assembly. The carriage assembly of one example comprises a carriage member defining a distal surface portion and a retaining member defining a main portion. The retaining member may be supported by the carriage member such that a gap is defined between the main portion of the retaining member and the distal surface portion of the carriage member. The carriage member may be supported by the body member such that the distal surface portion of the carriage member extends out of or is accessible within the carriage passageway. The fishing line may be secured to the fishhook by a knot. The fishhook may be arranged at least partly within the gap between the main portion of the retaining member and the distal surface portion of the carriage member such that the fishhook is supported in a desired orientation relative to the body member.

BRIEF DESCRIPTION OF THE SEVERAL VIEWS OF THE DRAWINGS

FIG. 2 depicts a portion of FIG. 1 with the first example carriage assembly disengaged from the first example body member showing the cavity in the body member into which the carriage assembly resides.

FIG. 3 is a perspective view of a first example hook engaging portion of the first example carriage assembly as depicted in FIG. 2.

FIG. 8 is a side view of the second example hook engaging portion, where the second example hook engaging portion is shown supporting a fishhook connected to a fishing line.

FIG. 9 is a rear view of the second example carriage assembly, where the second example hook engaging portion is shown supporting a fishhook.

FIG. 10 is a perspective, partial cutaway, exploded view of a third example lure system of the disclosed apparatus comprising a second example body member and a third example carriage assembly with a third example hook engaging portion.

FIG. 14 is a perspective, partial cutaway, exploded view of a fourth example lure system of the disclosed apparatus comprising a fourth example body member and a fourth example carriage assembly comprising a fourth example hook engaging portion supporting a fishhook.

FIG. 15 is a side elevation view of the fourth example hook engaging portion.

FIG. 16 is a rear elevation view of the fourth example hook engaging portion, where the fourth example hook engaging portion is shown supporting a fishhook.

DETAILED DESCRIPTION OF THE DISCLOSURE

Figure 1:
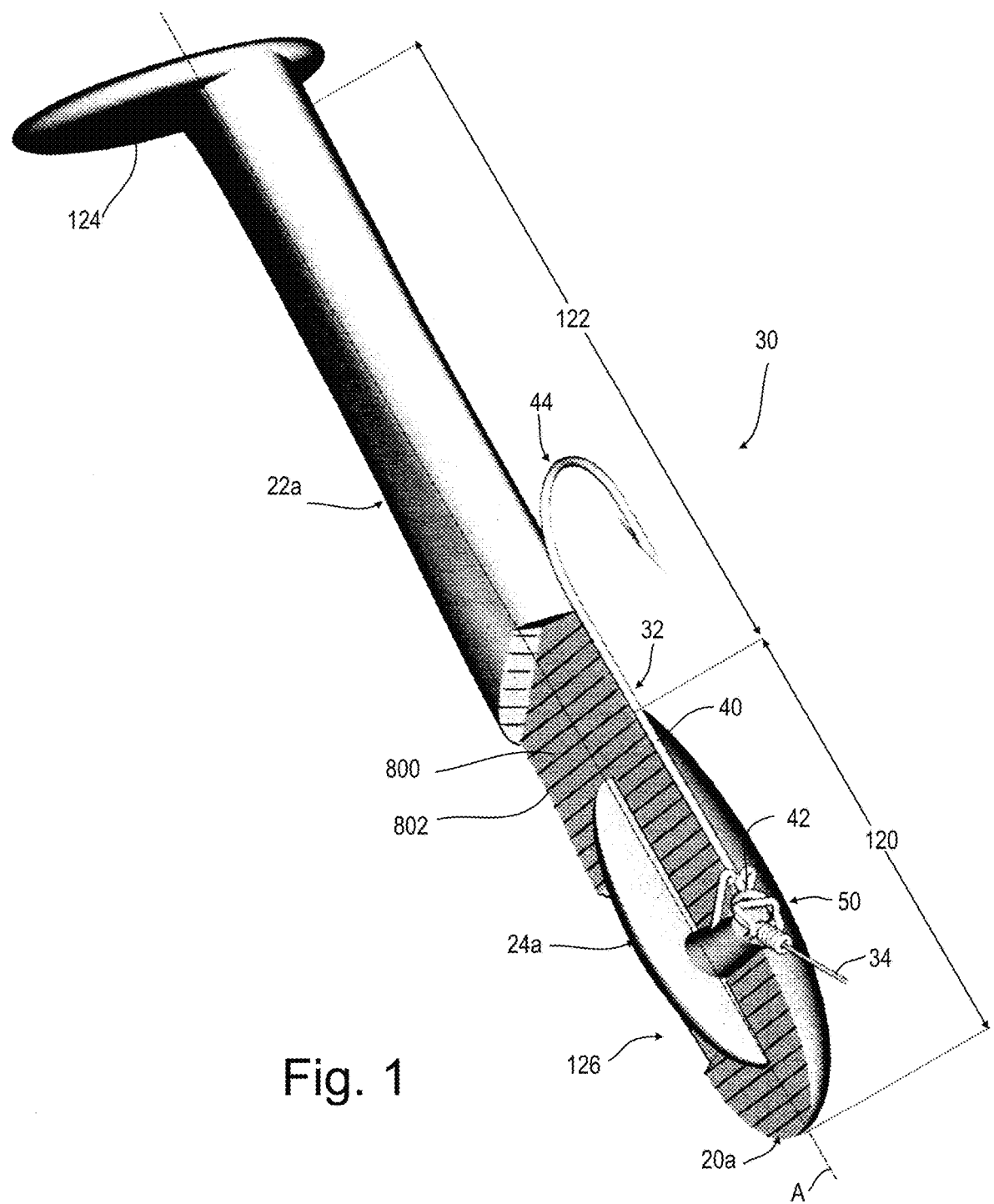
FIG. 1 is a perspective, partial cutaway view of a first example lure system of the disclosed apparatus comprising a first example body member and a first example carriage assembly, where the first example carriage assembly is supporting a fishhook connected to a fishing line.

In the field of fishing lures, it is often desired to have a lure that is attached to a hook during a phase of attracting a fish to a hook, but once the fish strikes it may be desired to release the hook from the lure once the fish is "hooked".

It may also be desired in some applications to be able to use varying weights inside of a lure, where they are not noticed.

Hooks are released from the carriage when a fish strikes (bites) the hook and thus is hooked. The material of the retaining members may be made of spring steel or a similar resilient material which bends slightly when the hook is placed in or removed from the retaining member 152, but do not flex or bend sufficiently to release the hook in normal operation prior to a fish strike or similar force. The retaining member 152 in several examples holds the carriage assembly and attached components on the fishing line after the hook is released from the carriage. Several of the examples disclosed here show how the rigid portion (wires) (bracket), with or without confining grooves or channels in the head portion, keeps the hook in proper alignment on a high impact landing (strike) when the lure is cast. These examples allow the hook to turn sideways when a fish is hooked so that the hook eye is freed from the rigid member or carriage assembly and the line can slide through the (two) rigid vertical arm portions. Examples are shown where the top of the support post, along with the two upright arms, act as a single pivot point to the hook. When the hook shank is compressed into the top of the resilient body member, upward pressure from the compression keeps the hook eye in place under the rigid member. When a fish strikes the lure and realizes it's not food, the fish will shake its head and do everything possible to expel the hook. Head shakes will keep the hook in the mouth, but the body along with the carriage will be pushed sideways to unlock the hook shank. Once unlocked, the lure Slides down the line away from the hook and the soft body avoids damage inside the "shear zone" within the fish's mouth.

One way to see how the pivot works is to hold the hook firmly between the fingers on one hand, and with the other hand, push on the side of the of the body head member until hook shank slides under one of the lobes to release the hook eye. After the shank has cleared the lobes, shake the hook like a fish would shake its head, and the body with the carriage inside should slide down the line away from the hook.

When positioning a hook eye under the rigid member of some examples, it is important that the line knot pass through the forward gap between the two upright arms first. This may be best accomplished by wrapping a finger around the line a couple of times and pulling the hook eye tight against the vertical uprights of the rigid member . . . .

The apparatus and methods disclosed herein may take a number of different forms, and several examples of the disclosed apparatus and methods will be described separately below.

A numbering system is used where generic components have a numeric prefix and specific examples have an alphabetic suffix. For example, a body member 22 may be depicted by a specific example body member 22a as shown in FIG. 1.

First Example Lure System

Referring initially to FIGS. 1-5 of the drawings, depicted therein is a first example lure system 20a. The first example lure system 20a comprises a first example body member 22a and a first example carriage assembly 24a fitted into a surface defining a cavity of the body member 22. To form at least a portion of a first example fishing system 30, the first example lure system 20a is removably connected to a fish hook 32 that is in turn connected to a fishing line 34 as shown in FIG. 1. The fishing hook 32 and fishing line 34 are or may be conventional and will not be described herein beyond that extent helpful to a complete understanding of the disclosed apparatus.

The first example carriage assembly 24a may be detachably connected to the body member 22a as can be seen by a comparison of FIGS. 1 and 2. Further, when the first carriage assembly 24 is connected to the body member 22a as depicted in FIG. 1, the first example carriage assembly 24a supports the hook 32 in a predetermined orientation relative to the body member 22 as shown or in other orientations. Further, the line 34 is operably connected to the first example carriage assembly 24a through the hook 32 such that a portion of the tension loads on the line 34 are transferred to the first example body member 22a through the hook 32 and the first example carriage assembly 24a. If any of the first example body 22, first example carriage assembly 24a, hook 32, or line 34 are damaged or worn, the first example lure system 20a may be disassembled to allow replacement of separate components of the fishing system 30 as depicted in FIG. 1.

Figure 4:
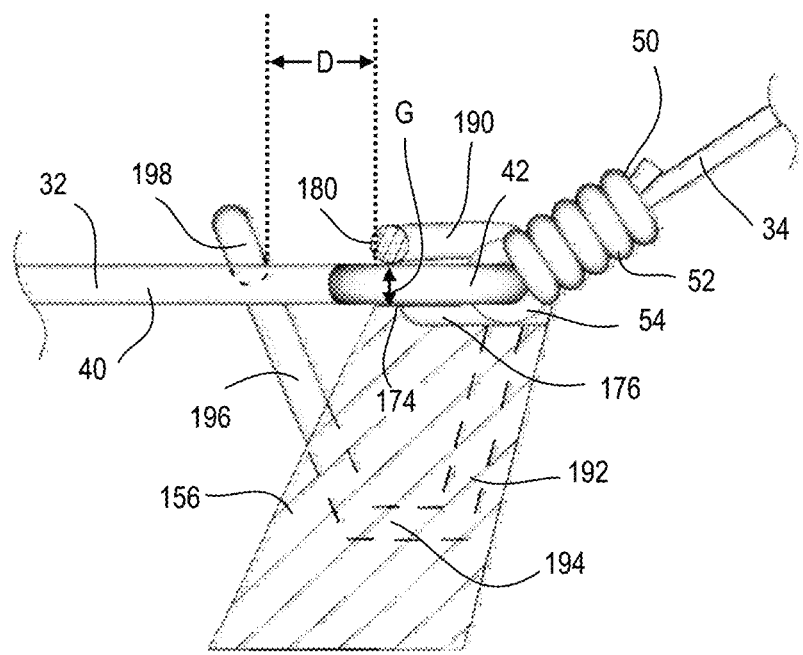
FIG. 4 is a longitudinal partial section view of the first example hook engaging portion when supporting a fishhook connected to a fish line.
Figure 5:
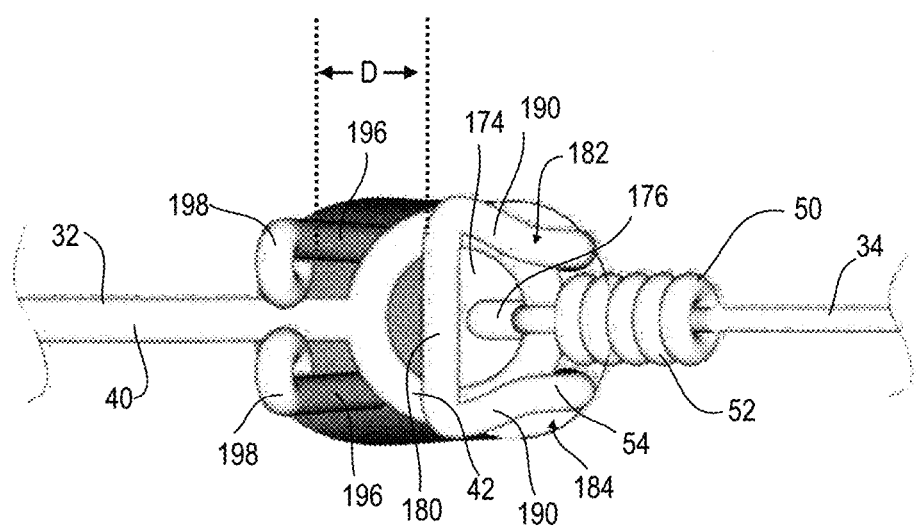
FIG. 5 is a top plan view of the first example hook engaging portion supporting a fishhook connected to a fish line.
Figure 6:
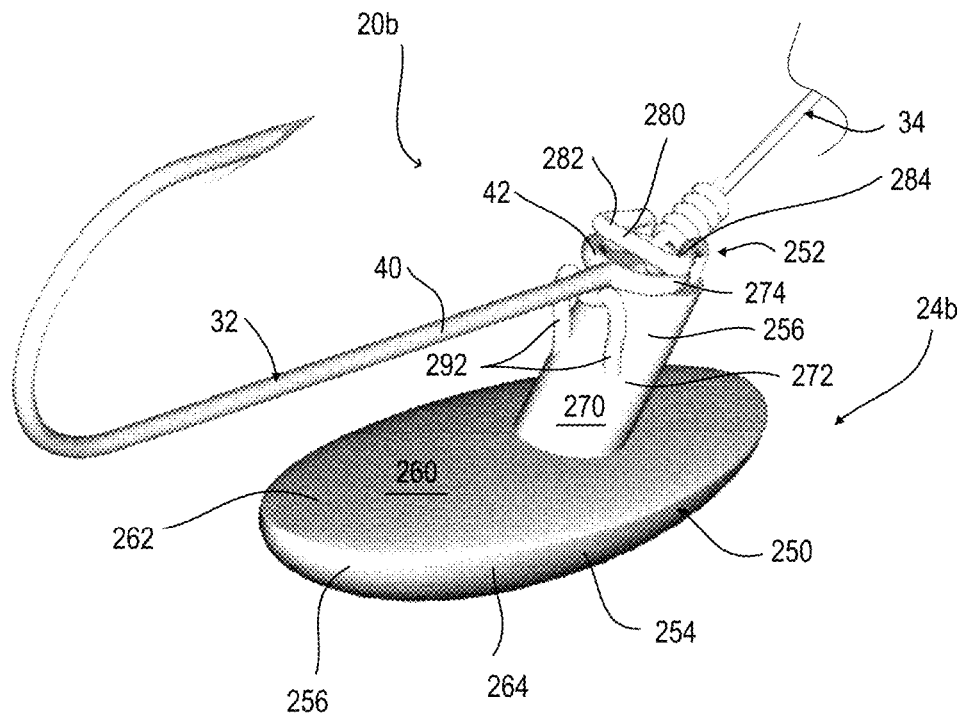
FIG. 6 is a perspective view of a second example carriage assembly supporting a fishhook connected to a fish line, where the body member is not depicted in this figure.
Figure 7:
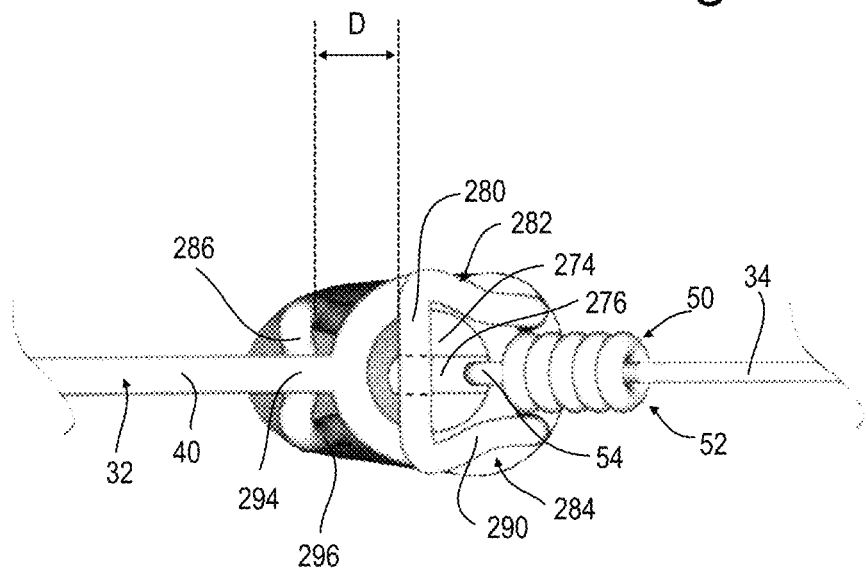
FIG. 7 is a top plan view of a second example hook engaging portion of the second example carriage assembly, where the second example hook engaging portion is shown supporting a fishhook connected to a fishing line.
Figure 11:
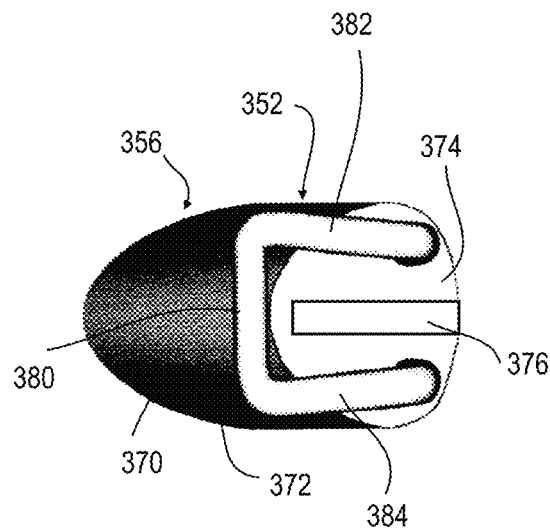
FIG. 11 is a top view of the third example hook engaging portion of the third example carriage assembly.

The example fishhook 32 defines a hook shank 40, a hook eye 42, and a hook end 44. A first end 54 of the line 34 may be connected to the fish hook 32 in one example by a line knot 50 comprising a knot loop 52 that extends through the hook eye 42 as best shown in FIGS. 4, and 5. The example line knot 50 may be conventional and may connect the first end 54 of the line 34 to the fish hook 32 such that loads on the fish hook 32 are transferred to the line 34.

The first example body member 22a as shown in FIG. 1 may comprise a head portion 120, a tail portion 122, and a baffle portion 124.

As shown in FIG. 2, one example includes a carriage passageway 126 formed in the head portion 120 of the first example body member 22a. The example carriage passageway 126 defines an insertion portion 130, a central portion 132, and a support post portion 134. The example carriage passageway 126 further defines a first opening 136 arranged on one side of the head portion 120 and a second opening 138 on an opposing second side of the head portion 120. The first opening 136 is in direct communication with the insertion portion 130 of the example carriage passageway 126, while the second opening 138 is in direct communication with the support post portion 134 of the example carriage passageway 126. The central portion 132 of the example carriage passageway 126 is defined at least in part by a first body bearing surface portion 140, while the support post portion 134 of the example carriage passageway 126 is defined at least in part by a second body bearing surface portion 142.

As shown in FIGS. 2-4, the first example carriage assembly 24a comprises a carriage member 150 with a retaining member 152. The carriage member 150 of this example includes a base 154 and a support post 156. The base 154 of the carriage member 150 includes a base surface 160 with a base bearing surface portion 162 and a base lock surface portion 164. The support post 156 of the carriage member 150 includes a support post surface 170 including a support post bearing surface 172 and a support post distal surface 174. A knot channel 176 may be formed in the support post distal surface portion 174. The example retaining member 152 includes a main portion 180 and first and second arms 182 and 184 extending from the main portion 180. FIGS. 3-5 illustrate one example where the first and second arm portions 182 and 184 symmetrically extend from the main portion 180 and each comprise an offset portion 190, a first intermediate portion 192 (optionally within the support post 156), a second intermediate portion 194 (optionally within the support post 156), a third intermediate portion 196 (optionally partially within the support post 156), and a fourth intermediate portion 198. The retaining member 152 of this example is sufficiently rigid to engage the hook 32 as described herein but exhibits sufficient resiliency to form a spring clip that positively grips and releases the fishing hook 32.

The carriage assembly 24a may be formed by embedding (casting) a portion of the retaining member 152 within the support post 156 of the carriage member 150 during casting of the carriage member for example such that the main portion 180 and distal portions 198 of the first and second arm portions 182 and 184 are not embedded within the support post 156 but protrude therefrom. So arranged, the main portion 180 is arranged adjacent to the knot channel 176, and the distal portions 198 are adjacent to but spaced slightly aft (rearward) of the distal surface portion 174 of the support post surface 170. A gap G (See FIG. 4) is formed between the main portion 180 and the distal surface portion 174 of the support post surface 170. This gap G may be sized to clamp onto and operatively release the eye 42 or another portion of the hook 32. The main portion 180 is further spaced a distance D from the distal portions 198 of the first and second arm portions 182 and 184.

The example fishing system 30 with the first example lure system 20a may be assembled as follows: The first example body member 22 is formed such that the carriage member 150 is positioned within the carriage passageway 126. Thus placed, the base 154 is within the central portion 132 and at least a portion of the support post 156 thereof is within the support post portion 134. The support post distal surface portion 174 extends out of the body member 22 or is accessible through one of the first and second openings 136 and 138 of the carriage passageway 126. In the example lure system 20a, the support post distal surface portion 174 extends out of the second opening 138 of the carriage passageway 126.

In this arrangement, the first body bearing surface portion 140 engages the base bearing surface portion 162 and the second body bearing surface portion 142 engages the support post bearing surface portion 172. The bearing surfaces 140 and 162 and the bearing surfaces 142 and 170 may engage each other to prevent the carriage member 150 from passing through the carriage passageway 126 and out of the second opening 138 during normal use. The distal end 54 of the line 34 is inserted through the gap G, and the knot 50 is formed to secure the distal end of the line 34 to the hook eye 42. The line 34 is placed under tension and pulled such that the hook eye 42 is displaced into the gap G. The distal portions 198 of the first and second arm portions 182 and 184 engage the hook shank 40 and the knot channel 176 receives the knot loop 52 to ensure that the hook 32 is properly aligned with the first example body member 22a. At this point, tension loads on the line 34 during normal use of the example fishing system 30 are transferred by the hook eye 42 to the offset portions 190 of the first and second arm portions 182 and 184 of the retaining member 152, and to the carriage member 150, and to the example body member 22. The example fishing system 30 may be used in a conventional fashion to attract and catch game fish.

Alternatively, the distal end 54 of the line 34 may be inserted through the second opening 138 in the first example body member 22a, through the carriage passageway 126, exiting out of the first opening 136, through the gap G, back through the carriage passageway 126, and back through the second opening 138. The knot 52 may be formed to secure the distal end 54 of the line 34 to the hook eye 42. The carriage member 150 is arranged such that the base 154 is within the central portion 132 and the support post 156 is within the support post portion 134 of the carriage passageway 126 as described above. The line 34 is placed under tension such that the hook eye 42 is displaced/pulled into the gap G. At this point, further tension loads on the line 34 are transferred by the hook eye 42 to the offset portions 190 of the first and second arm portions 182 and 184 of the retaining member 152, to the carriage member 150, and to the example body member 22. The example fishing system 30 may be used in a conventional fashion to attract and catch fish.

When the support post 156 supports the hook 32, the hook eye 42 is arranged within the gap G, between the main portion 180 of the retaining member 152 and the support post distal surface portion 174 and with the knot loop 52 partly received within the knot channel 176. Further, the distal portions 198 of the retaining member 152 may be adapted to engage the hook shank 40 and properly align the hook 32 during normal use of the example lure system 20a. Also, the example distal portions 198 of the retaining member 152 are arranged relative to the knot channel 176 such that the hook shank 40 is properly oriented with respect to the body member during normal use of the lure system 20a. Typically, the hook shank 40 is properly oriented with respect to the body member 22a when the hook shank 40 is parallel to the longitudinal axis A (FIG. 1) of the body member 22a and the hook end 44 faces away from the body member 22a as shown in FIG. 1.

To disassemble the first example lure system 20a, the line 32 may be cut to remove the proximal end 50 thereof from the hook 32. The first example body member 22a is then deformed (stretched) such that the carriage member 150 may be removed from the carriage passageway 126.

The exact shape and dimensions of the carriage member 150 and the carriage passageway 126 are not critical but should meet a desirable balance of the following characteristics:

While the carriage member 150 may be easily insertable into and removeable from the carriage passageway 126 by deliberate application of manual force; the carriage member 150 should not be easily nor accidentally dislodged from the carriage passageway 126 during normal use of the lure system 20a prior to being struck by a fish or an equivalent force. The tension loads on the line 34 should be effectively transferred by the carriage member 150 to the first example body member 22a; and a bulk of the head portion 120 of the first example body member 22a should be minimized to allow natural-looking movement of the lure system 20a when moving through the water during normal use.

To achieve these characteristics, the first example lure system 20a may employ complementary flat (substantially planar) surfaces to define the first body bearing surface portion 140 and the base bearing surface portion 162 and use complementary tapered surfaces to define the second body bearing surface portion 142 (FIG. 2) and the support post bearing surface portion 172. These surfaces effectively transfer line loads from the carriage member 150 to the first example body member 22a while minimizing damage to the body member 22a.

Further, the example carriage member 150 of one example defines a long, narrow form factor that allows the bulk at the head portion 120 of the first example body member 22a to be minimized. In one example, the carriage member 150 may be elongated in the direction of a longitudinal axis of the body member 22a and relatively narrow in the direction orthogonal to the longitudinal axis A of the body member 22a. The head portion body 120 of the body member 22a thus may also be relatively long in the direction of the longitudinal axis A of the body member 22a and relatively narrow in the direction orthogonal to the longitudinal axis A of the body member 22a. The bulk of the head portion 120 thus may be minimized, and the shape of the head portion 120 may be hydrodynamically designed to obtain desirable movement of the lure system 20 through the water.

The size, shape, and dimensions of the head portion 120 of the body member 22a are further determined based on the size, shape, and dimensions of the body member 22a and/or tail portion 122 thereof to obtain desirable movement of the lure system 20 through the water. In particular, a length of the tail portion 122 may be approximately twice the length of the head portion 120. Alternatively, a ratio of the length of the tail portion 122 to the head portion 120 may be in a first range of 1.5:1 and 4:1 and may be within a second range of greater than 1:1. A length of the head portion 120 relative to a dimension of the head portion 120 in any direction orthogonal to the longitudinal axis A of the body member 22a may be approximately 3:1. Alternatively, a length of the head portion 120 relative to a dimension of the head portion 120 in any direction orthogonal to the longitudinal axis A of the body member 22a may be in a first range of 2:1 and 6:1 and may be within a second range of greater than 1:1.

Additionally, the example base lock surface portion 164 of the carriage member 150 may be curved to facilitate insertion of the carriage member 150 into and removal of the carriage member 150 from the carriage passageway 126. The central and support post portions 132 and 134 of the carriage passageway 126 may be further shaped to conform to at least a portion of the surfaces of the base portion 154 and the support post 156 to ensure a snug, compact fit between the carriage member 150 and the first example body member 22a.

The first example body member 22a may be made of a resilient material and may be sized, shaped, and dimensioned to approximate the shape and movement of a desired baitfish when towed through the water. The body member 22 may be made of rubber, silicone, and other materials having a hardness as measured by a shore durometer test of between 15 and 50. The example carriage member 150 may be made of a material, such as lead, aluminum, tin, and alloys of each that provides an appropriate weight to the first example lure system 20a. If lead is used to form the example carriage member 150, the carriage member 150 can be removed, reused, and/or disposed of properly if the carriage member 150 is damaged. The example retaining member 152 may be formed by a length of rigid wire bent or otherwise formed to define the main portions 180 and the first and second arm portions 182, and 184 as described herein. The material from which the wire is formed and the exact configuration and dimensions of the example retaining member 152 are not critical to any given implementation of the disclosed apparatus so long as the retaining member 152 engages and secures the hook 32 as described herein. In one example, the material forming the carriage member 150 is cast around a portion of the retaining member 152 to secure the retaining member 152 to the carriage member 150.

Second Example Lure System

FIGS. 6-9 show a second example lure system 20b constructed in accordance with and embodying many of the principles of the disclosed apparatus. The second example lure system 20b comprises in one example a body member 22 such as the first example body member 22a and a second example carriage assembly 24b. To form at least a portion of a fishing system such as the first example fishing system 30, the second example lure system 20b is operatively connected to the hook 32 and to the line 34 as shown in FIGS. 6-9 as described herein.

The second example carriage assembly 24b is removably attached to the body member 22b. Further, when the second carriage assembly 24b is supported by the body member 22b, the second example carriage assembly 24b supports the hook 32 in a predetermined orientation relative to the body member. Further, the line 34 is operably connected to the second example carriage assembly 24b through the hook 32 such that tension loads on the line 34 are transferred to the body member through the hook 32 and the second example carriage assembly 24b. If any of the body member, second example carriage assembly 24b, hook 32, or line 34 are damaged or worn, the second example lure system 20b may be disassembled to allow replacement of any of the components of the fishing system.

FIGS. 6-9 illustrate that the second example carriage assembly 24b comprises a carriage member 250 and a retaining member 252. The example carriage member 250 includes a base component 254 and a support post component 256. The base 254 of the carriage member 250 includes a base surface 260 with a base bearing surface portion 262 and a base lock surface portion 264. The support post 256 of the carriage member 250 defines a support post surface 270 defining a support post bearing surface portion 272 and a support post distal surface portion 274. A knot channel 276 is formed in the support post distal surface portion 274. The example includes a retaining member 252 including a main portion 280, first and second arm portions 282 and 284, and a distal portion 286. The first and second arm portions 282 and 284 extend between the main portion 280 and the end distal portion 286. The example first and second arm portions 282 and 284 (symmetrically) extend from the main portion 280 and each comprise an offset portion 290 and at least one intermediate portion 292. The example retaining member 252 is sufficiently rigid to engage the hook 32 as described herein but exhibits sufficient resiliency to form a spring clip that positively grips the hook 32.

The second example carriage assembly 24b may be assembled by embedding a portion of the retaining member 252 within the support post 256 of the carriage member 250 such that the main portion 280 and distal portion 286 are not embedded within the support post 256. With the retaining member 252 supported in this manner by the carriage member 250, the main portion 280 is arranged adjacent to the knot channel 276 and the distal portion 286 is adjacent to but spaced slightly aft (rearward) of the distal surface portion 274 of the support post surface 270. A gap G exists between the main portion 280 and the distal surface portion 274 of the support post surface 270 for placement of the eye of the fishing hook. The main portion 280 is also spaced a distance D from the distal portion 286 for proper placement, connection, and release of the eye of the fishing hook 32.

When the support post 256 is attached to the hook 32, the hook eye 42 is arranged within the gap G between the main portion 280 of the retaining member 252 and the support post distal surface portion 274 and with the knot loop 52 partly received within the knot channel 276. Further, the distal portion 286 of the retaining member 252 defines a notch 294 adapted to engage the hook shank 40 and properly align the hook 32 during normal use of the example lure system 20b. When struck by a fish, this arrangement including the gaps D and G allows the hook to release from the retaining member 252. The example notch (or u-bend) 294 is substantially aligned with the knot channel 276 such that the hook shank 40 is properly oriented with respect to the body member during normal use of the lure system 20b. In one example, the hook shank 40 is properly oriented with respect to the body member when the hook shank 40 is parallel to the longitudinal axis of the body member and the hook end 44 faces away from the body member.

Third Example Lure System

Figure 12:
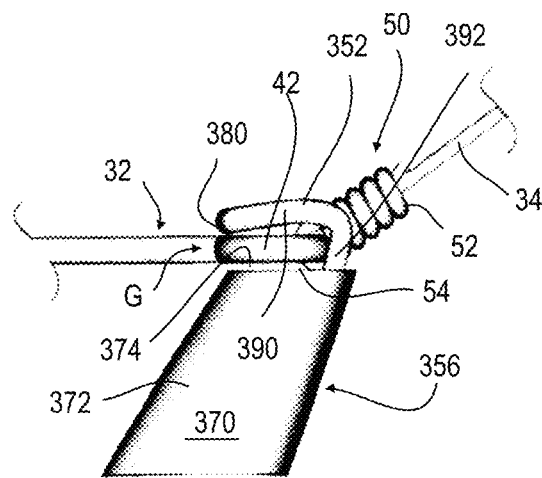
FIG. 12 is a side view of the third example hook engaging portion, where the third example hook engaging portion is shown supporting a fishhook connected to a fish line.
Figure 13:
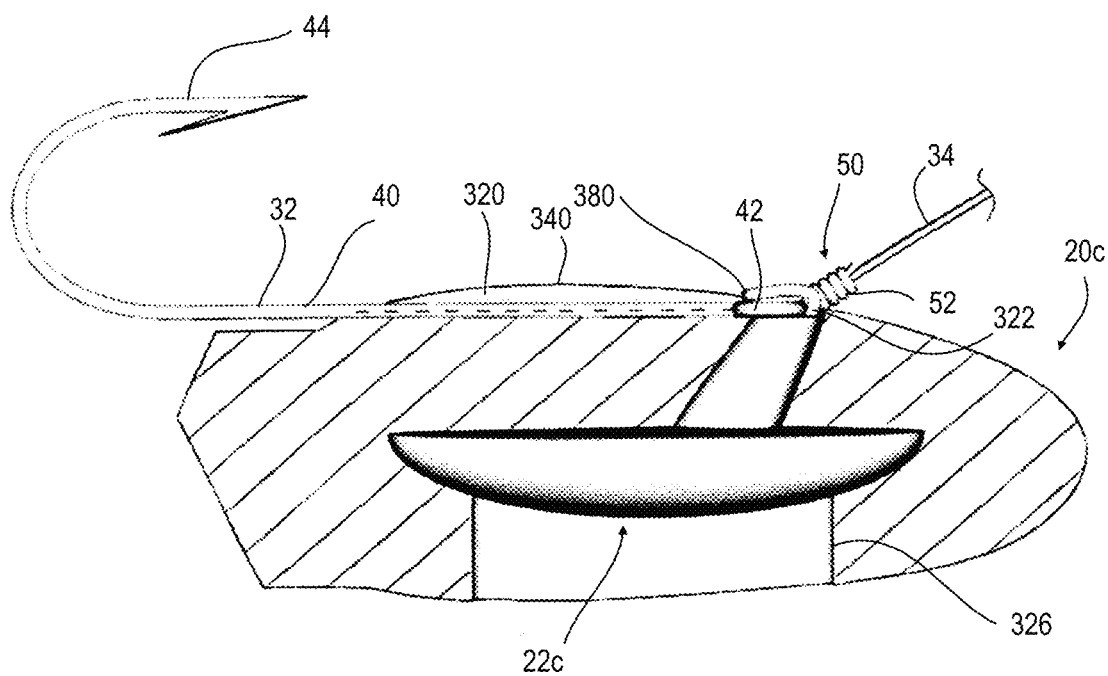
FIG. 13 is a side, partial section view depicting the third example carriage assembly supported by the second example body member, where the third example hook engaging portion of the third example carriage assembly is shown supporting a fishhook connected to a fishing line.
Figure 17:
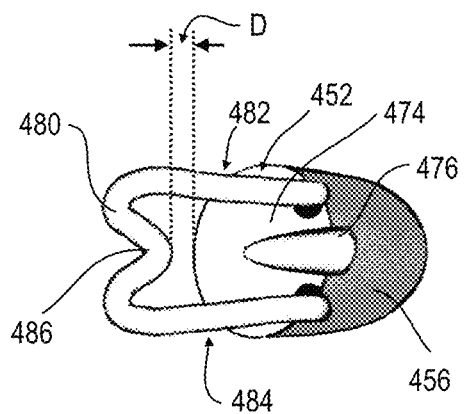
FIG. 17 is a bottom plan view of the fourth example hook engaging portion.

Referring now to FIGS. 10-13 of the drawing, is a third example lure system 20c constructed in accordance with, and embodying, the principles of the disclosed apparatus. The third example lure system 20c comprises a third example body member 22c and a third example carriage assembly 24c similar to equivalent structures described above. The third example body member 22c may be the same as or similar to the first example body member 22a and will not be described again in detail. To form at least a portion of the fishing system 30, the third example lure system 20c may be operatively connected to the hook 32 and to the line 34 as shown in FIGS. 12 and 13.

The third example carriage assembly 24c is removably attached to the body member 22c as shown in FIG. 10. Further, when the third carriage assembly 24c is supported by the body member 22c, the third example carriage assembly 24c supports the hook 32 in a predetermined orientation relative to the body member 22c. Further, the line 34 is operably and removably connected to the third example carriage assembly 24c through the hook 32 such that tension loads on the line 34 are transferred to the example body member 22c through the hook 32 and the third example carriage assembly 24c. If any of the body member 22c, third example carriage assembly 24c, hook 32, or line 34 are damaged or worn, the third example lure system 20c may be disassembled to allow replacement and proper disposal of any of the components of the third example lure system 20c or any fishing system incorporating the third example lure system 20c.

The example body member 22c is similar to the first example body member 22a but defines a hook groove 320 in a raised "hump" 340 of the body member 22c. This hook groove 320 may be adjacent to a support post opening 322 defined by a carriage passageway 326 like the carriage passageway 126 of the first example body member 22a.

The third example comprises many components similar in function to those previously described such as a carriage assembly 24c which comprises a carriage member 350 and a retaining member 352. The third example carriage member 350 defines a base 354 and a support post 356 similar to those described above. The base 354 of the carriage member 350 defines a base surface 360 defining a base bearing surface portion 362 and a base lock surface portion 364. The support post 356 of the carriage member 350 defines a support post surface 370 defining a support post bearing surface portion 372 and a support post distal surface portion 374. A knot channel 376 is formed in the support post distal surface portion 374, this knot channel reducing friction between the fishing line and the support post, to reduce abrasion and potential breakage of the fishing line. The example retaining member 352 defines a main portion 380 as well as first and second arm portions 382 and 384. The first and second arm portions 382 and 384 symmetrically extend from the main portion 380 and each comprise an offset portion 390 and at least one intermediate portion 392. The example retaining member 352 is sufficiently rigid to engage the hook 32 as described herein but exhibits sufficient resiliency to form a spring clip that positively grips the hook 32.

FIG. 13 shows a dashed line representing the bottom of the hook groove. This shows the hook shank being compressed into the groove by the retaining member. The compression allowing for a spring action and helping to keep the hook in proper alignment along the lure's dorsal surface.

The example carriage assembly 34b may be formed by embedding a portion of the retaining member 352 within the support post 356 of the carriage member 350 such that the main portion 380 is not embedded within the support post 356. So arranged, the main portion 380 is arranged adjacent to the knot channel 376. A gap G is formed between the main portion 380 and the distal surface portion 374 of the support post surface 370 for receiving the eye of the fish hook.

When the support post 356 supports the hook 32, the hook eye 42 is arranged within the gap G between the main portion 380 of the retaining member 252 and the support post distal surface portion 374 and with the knot loop 52 partly received within the knot channel 376. Further, the example hook groove 320 and the knot channel 376 may be substantially aligned when the third example lure system 20c is formed. Accordingly, the hook groove 320 engages the hook shank 40 to align the hook 32 with the longitudinal axis A of the body member 22c such that the hook 32 is properly oriented relative to the body member 22c as shown in FIG. 13. Typically, the hook shank 40 is properly oriented with respect to the body member when the hook shank 40 is parallel to the longitudinal axis of the body member and the hook end 44 faces away from the body member.

Fourth Example Lure System

Figure 18:
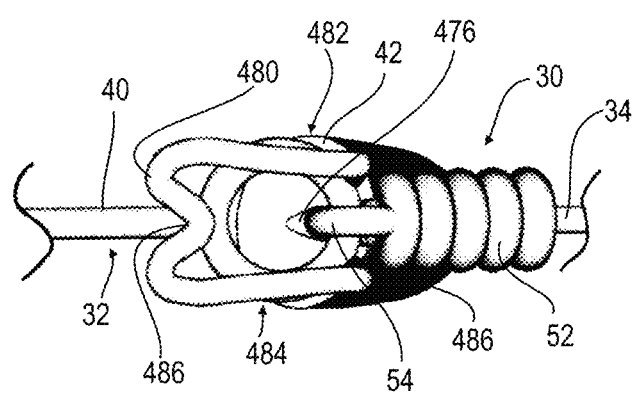
FIG. 18 is a bottom plan view of the fourth example hook engaging portion, where the fourth example hook engaging portion is shown supporting a fishhook connected to a fishing line.
Figure 19:
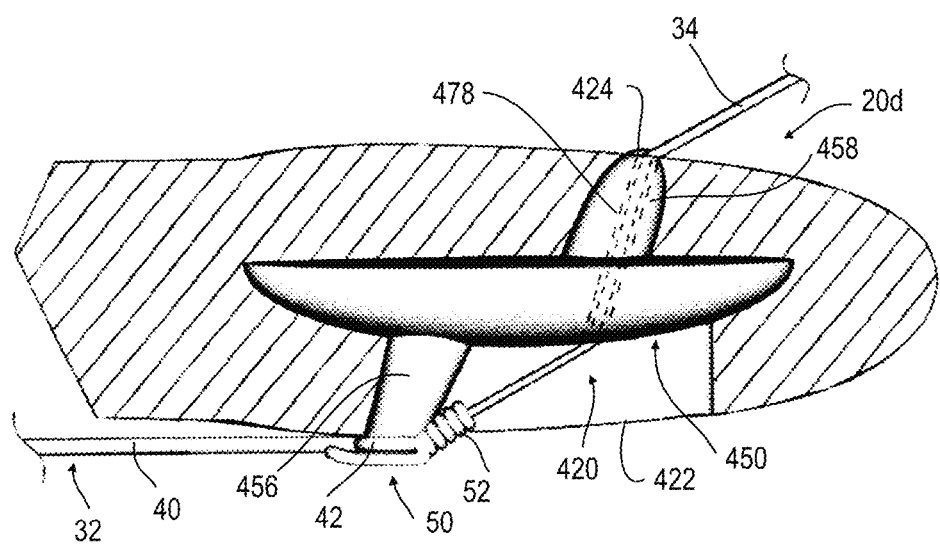
FIG. 19 is a side elevation, partial cutaway view depicting the third example lure system with the fourth example hook engaging portion supporting a fishhook connected to a fishing line and the fourth example carriage assembly is supported by the third example body member.
Figure 20:
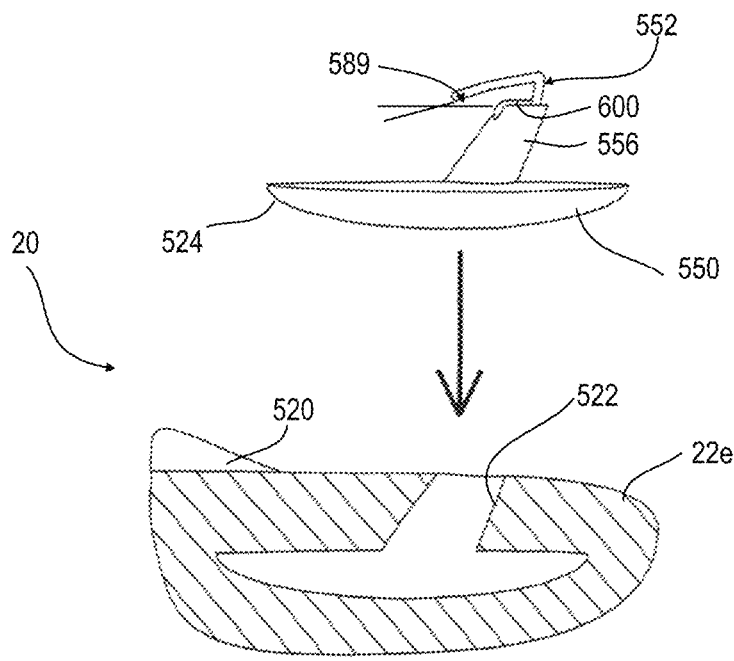
FIG. 20 is a side assembly view of one example of a main body component separated from a carriage assembly component of the disclosed fishing lure system.

Referring now to FIGS. 14-19, depicted therein is a fourth example lure system 20d. The fourth example lure system 20d in one example comprises a fourth example body member 22d and a fourth example carriage assembly 24d. To form at least a portion of a fishing system such as the first example fishing system 30, the fourth example lure system 20d is operatively/removably connected to the hook 32 and to the line 34 as shown in FIGS. 14, 18, and 19. In one example use, the fourth example differs from the previously described examples in that it is configured with the hook 32 to remain vertically below the body member 22d during normal use. As the fishing systems 30 move through the water in use, the relative position changes constantly, so this orientation is often reversed in each example.

The fourth example carriage assembly 24d may be removably attached to the body member 22d. Further, when the fourth example carriage assembly 24d is supported by the body member 22d, the fourth example carriage assembly 24d supports the hook 32 in a predetermined orientation relative to the body member 22d. Further, the line 34 is operably connected to the fourth example carriage assembly 24d through the hook 32 such that tension loads on the line 34 are transferred to the body member 22d through the hook 32 and the fourth example carriage assembly 24d. If any of the body member 22d, fourth example carriage assembly 24d, hook 32, or line 34 are damaged or worn, the fourth example lure system 20d (or other examples) may be disassembled to allow replacement of any of the components of the fishing system.

The fourth example body member 22d is similar to those previously described and will thus not be described herein beyond that extent helpful to an understanding of the fourth example lure system 20d. Many different styles, shapes, and materials may be combined to produce a working body member 22d. As with the previous examples. the fourth example body member 22d defines a carriage passageway 420. Like the carriage passageway 126 of the first example body member 22a, the carriage passageway 420 defines a first opening 422 and a second opening 424.

FIGS. 14 and 19 illustrate that the fourth example carriage assembly 24d may comprise a carriage member 450 and a retaining member 452. The example carriage member 450 includes a base 454, a support post 456, and a surface defining a line guide 458 through the carriage member. The base 454 of the carriage member 450 defines a base surface 460 defining a base bearing surface portion 462 and a base lock surface portion 464. The support post 456 of the carriage member 450 defines a support post surface 470 defining a support post bearing surface portion 472 and a support post distal surface portion 474. A knot channel 476 is formed in the support post distal surface portion 474. A line passageway 478 extends through the line guide 458 and the base 454. The example retaining member 452 defines a main portion 480 and first and second arm portions 482 and 484. The main portion 480 defines a notch 486 resting on each side of the shank of the fishing hook for proper alignment of the fishing hook. The first and second arm portions 482 and 484 each define an offset portion 490 and at least one intermediate portion 492. The example retaining member 452 is sufficiently rigid and resilient to engage the hook 32 as described herein but exhibits sufficient resiliency to form a spring clip that positively grips the hook 32.

The fourth example carriage assembly 24b is formed by embedding a portion of the retaining member 452 within the support post 456 of the carriage member 450 during casting of the carriage member 24d such that the main portion 480 is not embedded within the support post 456. With the retaining member 452 so supported by the carriage member 450, the main portion 480 is arranged adjacent to the knot channel 476 and is spaced slightly aft of the distal surface portion 474 of the support post surface 470. A gap G is formed between the main portion 480 and the distal surface portion 474 of the support post surface 470. The main portion 480 is further spaced a distance D from the support post 452.

In the fourth example lure system 20d, the support post 456 is arranged to extend through the first opening 422 such that the distal surface portion 474 of the support post surface 470 is adjacent to the first opening 422. Additionally, the line guide 458 is arranged such that a portion thereof extends through a portion of the carriage member, through the support post, out of the carriage passageway 420 through the second opening 424 defined by the carriage passageway 420 such that the line 34 extends from the fourth example 20d on the vertical side opposing the hook 32. Further, the line guide 458 may be assembled such that the line 34 passes through the line passageway 478 before the proximal end 50 thereof is secured to the hook 32 by the line knot 52 in the fourth example lure system 20d. In particular, when extended through the line passageway 478, the end 50 of the line 34 may be passed first through the second opening 424 of the carriage passageway 420 and then through the first opening 422 in the carriage passageway 420. The end 50 of the line 34 is then secured to the hook 32. In the fourth example lure system 20d, the line 34 thus passes through the carriage member 450 such that, during use, the hook 32 is on the opposite side of the example body member 24d from where line 34 enters the carriage passageway 420.

As an alternative, the line may be inserted through the second opening 424 defined by the carriage passageway 420. through the carriage passageway 420 and around the carriage member 450, and out of the first opening 422 defined by the carriage passageway 420. In this example, the line passageway 478 may be omitted or not used.

When the support post 456 supports the hook 32, the hook eye 42 is arranged within the gap G between the main portion 480 of the retaining member 452 and the support post distal surface portion 474 and with the knot loop 52 partly received within the knot channel 476. Further, the notch 486 defined by the main portion 480 of the retaining member 452 engages the hook shank 40 to ensure that the hook 32 is properly aligned during normal use of the fourth example lure system 40d. The knot channel 476 and notch 486 are further arranged such that the hook shank 40 is properly oriented with respect to the body member 22d during normal use of the lure system 20d. Typically, the hook shank 40 is properly oriented with respect to the body member 22d when the hook shank 40 is parallel to the longitudinal axis of the body member 22d and the hook end 44 faces away from the body member 22d as is depicted in FIGS. 14 and 19.

The fifth example shown in FIGS. 20-27 may not rely on the spring wires of the retaining member 552 flexing in order to release the hook 32. The spring wires of the retaining member 552 may be substantially rigid, although bendable enough to retain differing hook wire diameters or hook eye 190 diameters in a semi-permanent manner. Once adjusted for a specific hook size, the angle 589 on the wire may not change while catching/fighting a fish. In one example, retaining members 552 of smaller carriages utilize 0.031-inch diameter wire, while the retaining members 552 of larger carriage may be formed from 0.035-inch diameter wire or larger. Testing has shown that in some examples wire having a diameter of less than 0.031-inch may be slightly too flexible, especially for longer rigid members. On the other end of one size range, wire having a diameter larger than 0.040 may be too difficult to temporarily bend and may be more or less permanent.

Figure 21:
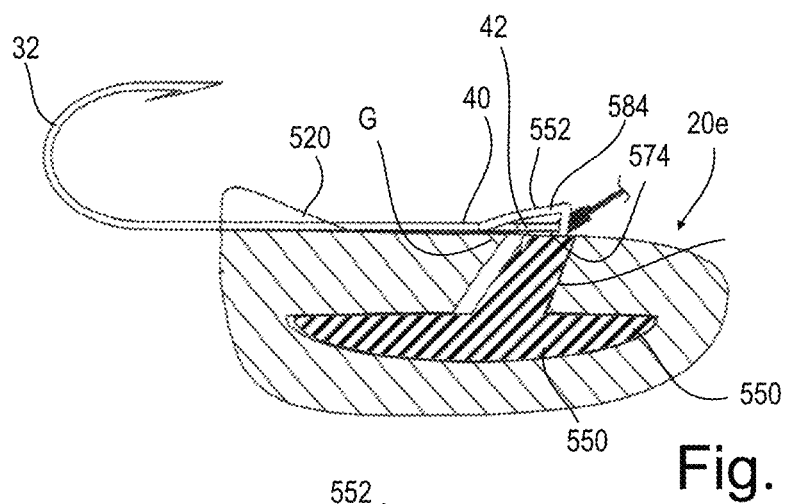
FIG. 21 is a side cross-sectional view of the components shown in FIG. 20 after assembly.

The fifth example carriage member 550 is similar to the third and fourth examples described above in that it relies on compression into the elastomer body member 22e and a retaining groove 520, and it has a two-lobed, angled rigid member. In FIG. 21, it can be seen that the shank of the hook 32 is compressed between the retaining member 552 and the support post. The elastomer body member 22e is pressed between the shank 40 of the hook 32 and the carriage member 550. In one example, the gap G is between the top of the elastomer body member 22e and the bottom of the lobes on the rigid carriage member 550.

Referring to the drawings, FIGS. 20-27 show a fifth example 20e, while FIGS. 28-31 show a sixth example. FIG.

21 shows a hook captured under the rigid member or wires or the retaining member. In this example the shank of the fishing hook 32 need not be compressed into the elastomer body member 22e but simply rest on top. In this example, the retaining member 552 is shown angled downward from front to back and has two shank-confining lobes. When the hook shank 40 is pushed to the side by a struggling fish during a strike, it is also guided downward by the lobes 582, 584 as the shank 40 is compressed into the elastomer body member 22e. These sideways and downward motions force the front of the hook eye along with the knot upward. Thus it may be desired to provide a rigid, angled retaining member 552 with higher elevation at the front to allow for this upward movement. A balance may be achieved between the amount of compression into the elastomer and the angle of the rigid member. The lock created must be firm enough to keep the hook properly orientated on a high impact landing when the lure is cast, but loose enough to turn sideways and be released by a struggling fish. See FIG. 25 to see how the angle of the rigid member angle differs in examples 586a, 586b, 586c.

Soft plastic (elastomers) used in fishing baits vary widely in hardness, with harder formulations providing greater compression. The angle on the rigid member will also determine how easily the hook will be released when the shank is pushed sideways. Longer members example 586c provide greater pressure on the shank, and a steeper angle example 586a results that the shank may be compressed deeper into the elastomer body member 22e when the hook 32 is pushed sideways during a strike.

The fifth example carriage member 24e in one example has a longer support post surface and a longer rigid retaining member 552 than shown in the previous examples. In one example, two lobes 582, 584 on the rigid retaining member form an angled groove/notch 588 therebetween to hold the hook shank 40 in proper alignment along the axis A.

In one example, the two arm portions 590 rise from the support post and are bent to form an angle 592 less than 90 degrees, or less than 85 degrees in a narrower example. The notch 588 in the rigid member creates two lobes 582, 584, and when placed at the acute angle, the surfaces of the lobes keep the hook eye from sliding backward on a high impact cast and yet release sideways when struck by a fish.

With this example, the retaining member 552 may be rigid, and not spring in order to function as intended; however, the retaining member 552 may be temporarily bent with sufficient pressure from an angler into a semi-permanent angle see examples 586a-586c to accommodate different hook sizes (differing hook wire diameters) or other desired purposes. Under normal fishing conditions the retaining member 552 should stay bent, but the gap G may be changed with sufficient upward or downward pressure. In one example, the retaining member of this or other examples is 0.035 stainless steel.

The angle of the rigid member 22 is important in many examples. If it does not capture enough of the shank, it will not keep the hook in proper alignment on a high impact landing during casting etc. If towed behind a boat (trolled) and there is no impact landing, there is not a substantial need for a steep angle. If the angle is too steep, the hook may be difficult to release when a fish is hooked. The higher elevation at the front of the rigid member allows the hook eye to rise when the shank is pushed downward at the same time it is pushed sideways.

Figure 26:
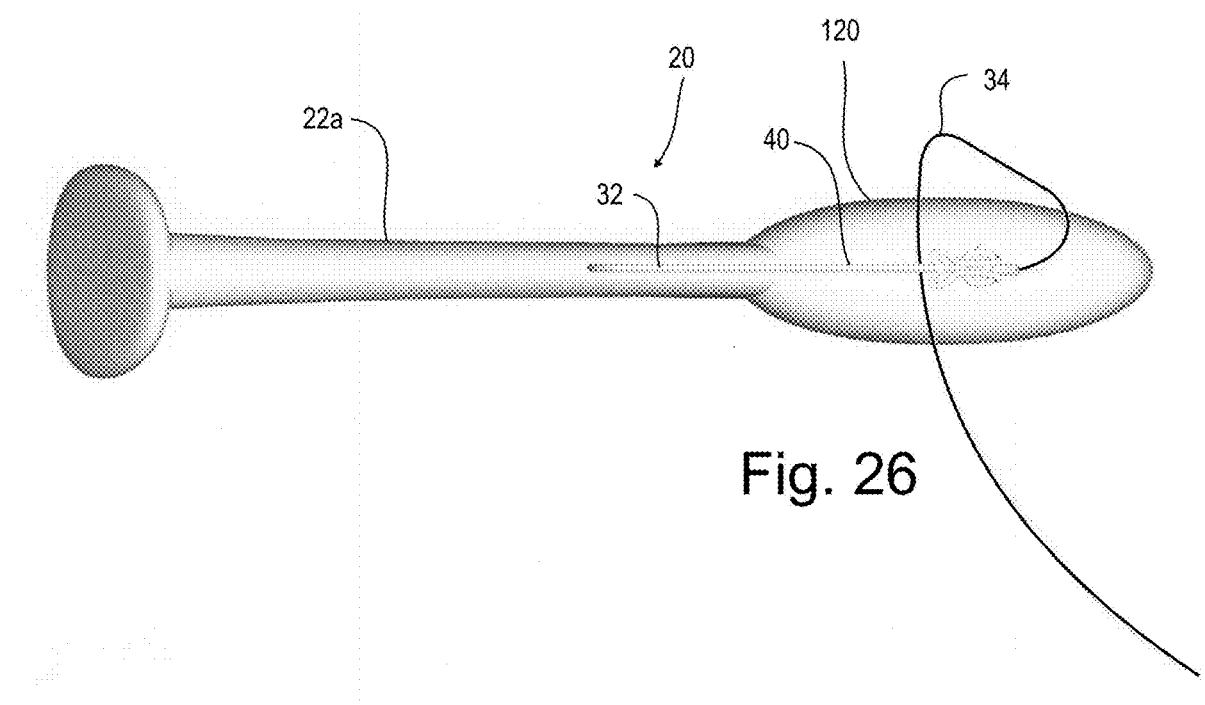
FIG. 26 is a top view of one example of the fishing lure system.
Figure 27:
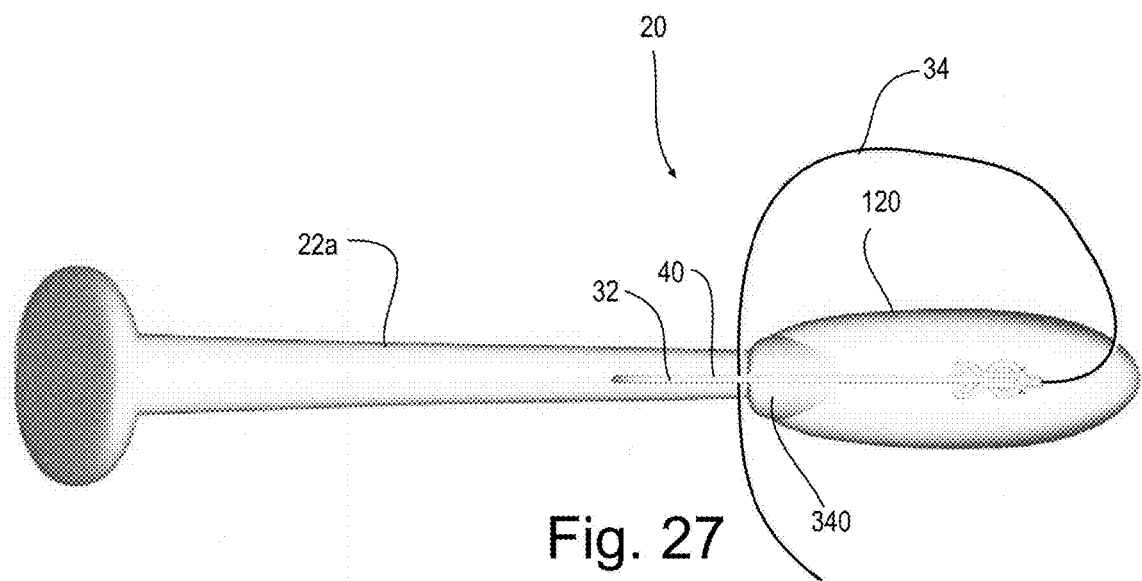
FIG. 27 is a top view of another example of the fishing lure system.

In FIGS. 26, 27 is shown an example where the elastomer main body 22a is configured to keep excess elastomer volume to a minimum (reduce drag) and keep the lure/fishing system 20 streamlined. With a hook shank 40 extending past the head portion, a long, flexible tail portion can easily dislodge a long shank hook out of alignment with the backbone axis on a hard impact landing when the lure is cast. This channeled hump 340 portion of the body member 22a helps keep the hook shank inside the two lobes of the rigid member on a hard landing.

A problem in the known prior art is that with a hook 32 lying on top of a body member 22a having a single forward pivot point attachment is fishing line 34 entrapment between the hook shank and the back of the soft body member 22a as shown in FIG. 26. If the line 34 gets trapped during the process of casting, landing, or the start of a retrieve, the lure will not run true, and it may increase the risk of tangles and knot failure.

FIG. 26 shows one example of this problem, and FIG. 27 shows the channeled hump 340 stopping the line 34 from sliding along the head 120 of the elastomer body member 22a between the hook 32 and the head 120 of the body member 22.

Known prior art examples may utilize hook retaining grooves on soft baits, but none to help keep a hook with a single forward pivot point in alignment with the lure's backbone axis. No known grooved soft plastic baits are designed to solve a line entrapment problem.

Figure 22:
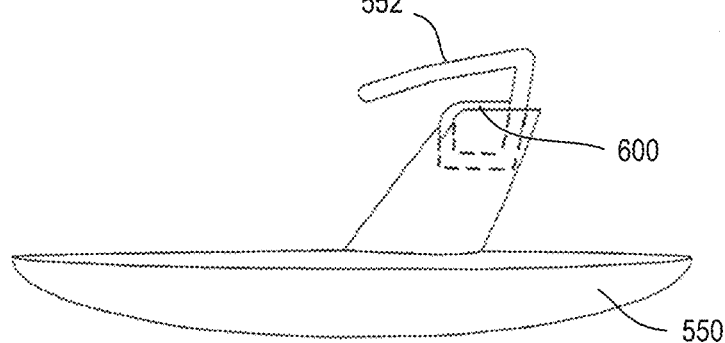
FIG. 22 is a side hidden line view of one of the carriage assembly component shown in FIG. 20.
Figure 23:
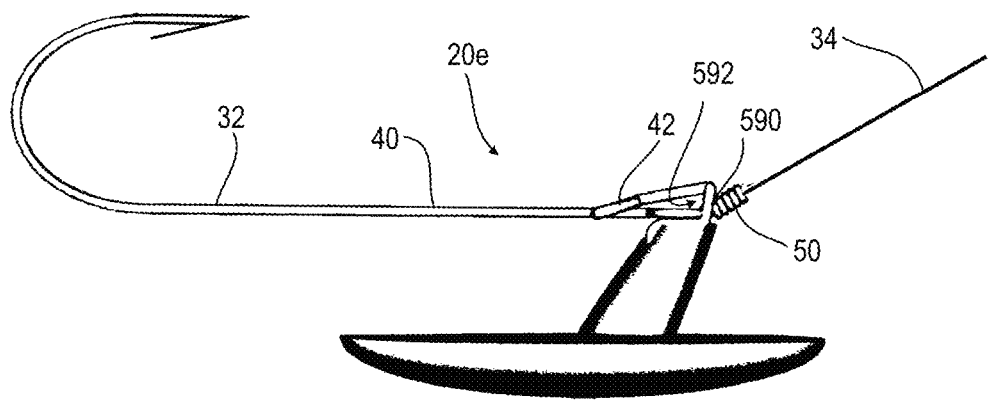
FIG. 23 is a side view of several components of the example shown in FIG. 20 in use without a body member.
Figure 24:
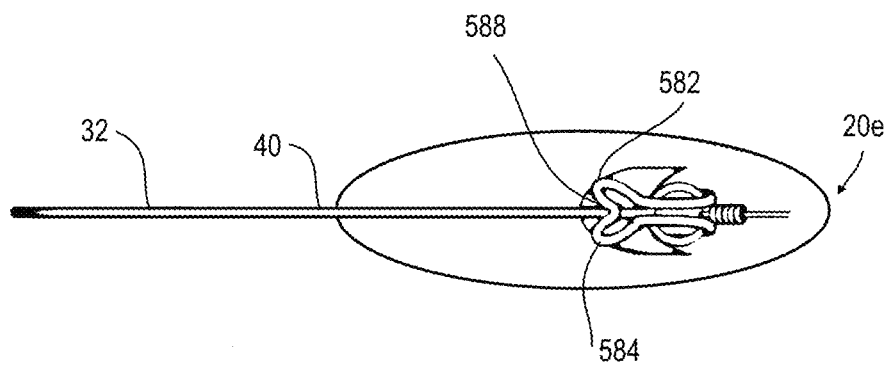
FIG. 24 is a top view of the example shown in FIG. 23.
Figure 25:
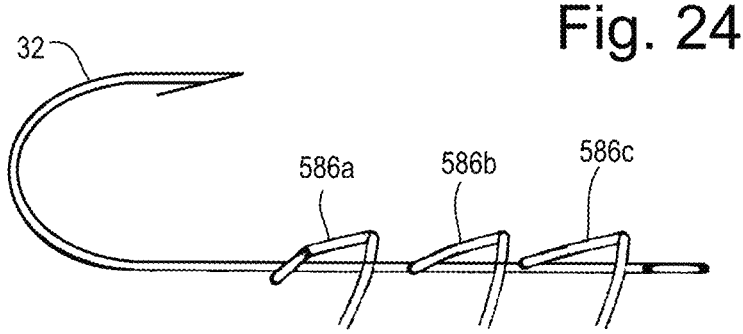
FIG. 25 shows multiple placement options of the hook on the carriage member.

In one example, as shown in FIG. 21, 22, the hook is kept pointing away from the body member by pressure on the hook eye 42 against a flat hard top 574 of the support post 556 with a friction fit against the retaining member 552 as previously described. With the carriage member 550 produced of soft castable materials such as lead, tungsten, bismuth, tin, or combinations and equivalents, wear on the top 574 of the support post due to friction could be problematic, thus in at least one example, the retaining member including rails 600 may be produced of stainless wire or other materials. The rails 600 may be made of the same wire and in the same casting as the rigid portions as shown in FIG. 22, or they could be added separately—for instance, glued or soldered to the carriage member.

In examples where these rails 600 protrude beyond the support post surface 574, a line knot groove may not be required on the support post surface 574.

FIG. 21 also shows an example with a single dorsal passageway for insertion of the carriage member 550 into body member 22e. The material of the body member 22e forming the dorsal passageway 522 may stretch to insert the carriage member 550 through. To ease installation, the rear 524 of the carriage member 550 may be inserted first into the passageway 522. The ability for a single passageway to pass and then hold a carriage will depend on the size of the passageway and the hardness of the elastomer.

The example of FIG. 21 includes an over-sized passageway 522 to allow for stretching without tearing.

Figure 28:
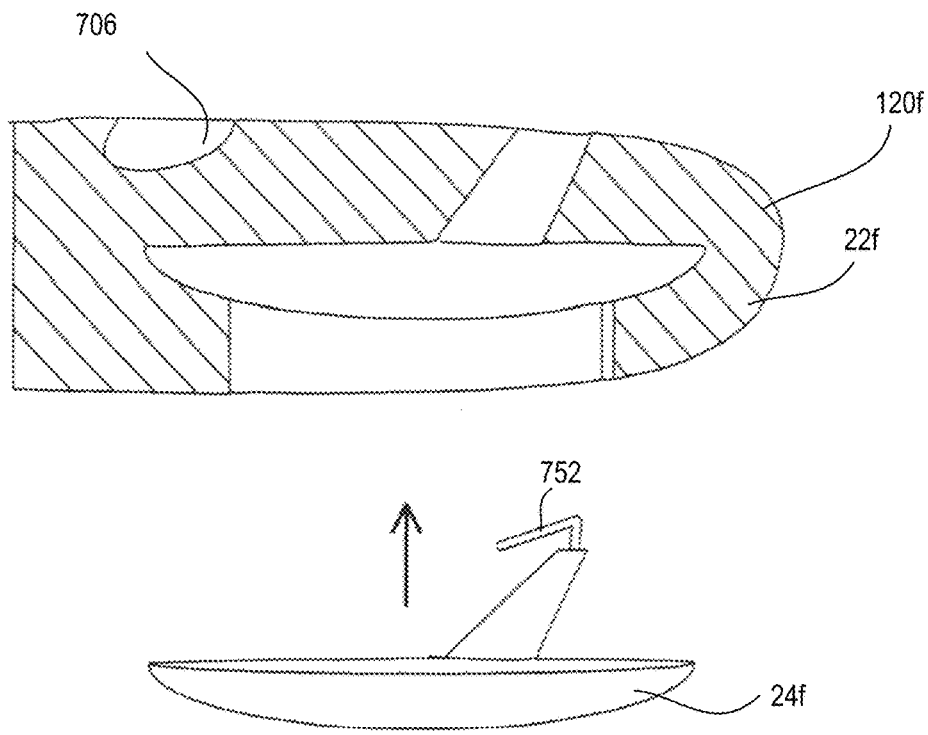
FIG. 28 is a side assembly partial cutaway view of another example of a main body component separated from a carriage assembly.
Figure 29:
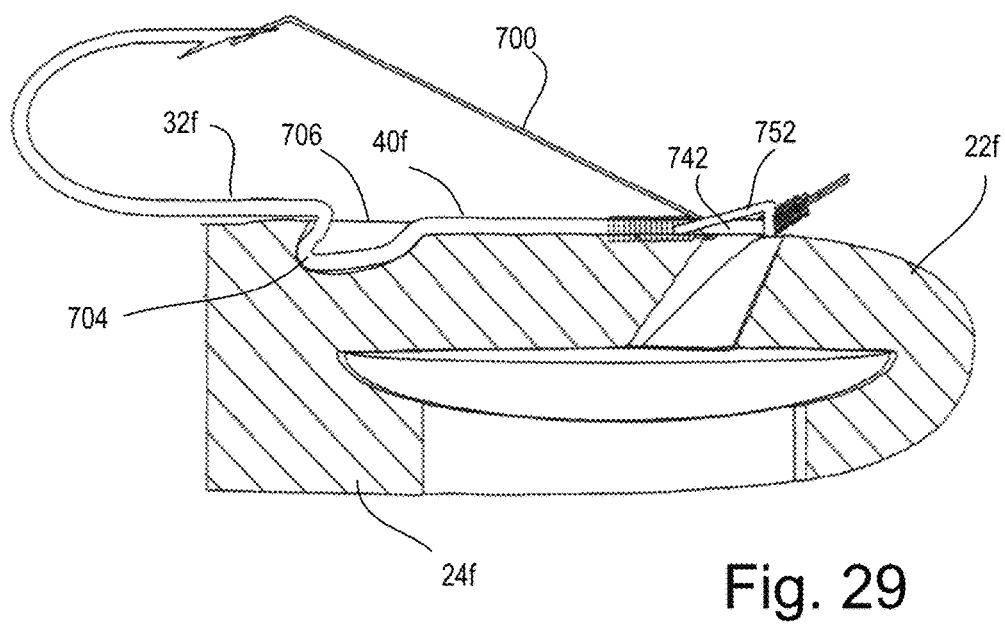
FIG. 29 is an assembled side partial cutaway view of the example shown in FIG. 28.
Figure 30:
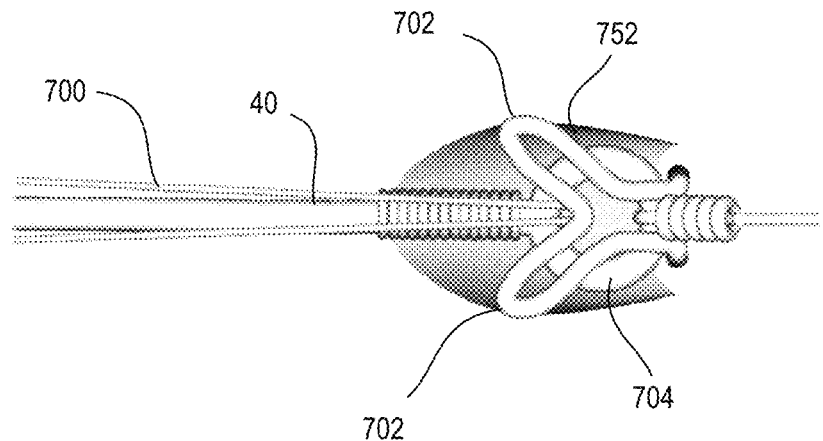
FIG. 30 is a top enlarged view of one example of connection components where a hook connects to the carriage assembly.
Figure 31:
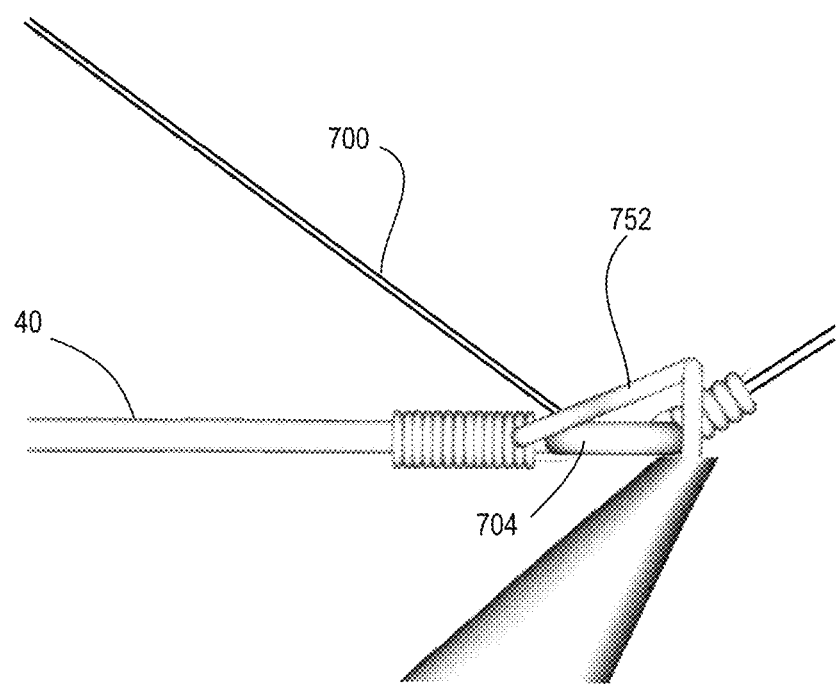
FIG. 31 is a side view of the example shown in FIG. 30.

The example shown in FIG. 28-31 comprises a retaining member 752 designed for a single hook 32e with a built-in weed guard 700. Since the weed guards 700 on most weedless hooks 32e are secured at the back of the hook eye 742, a retaining member may not be able to press down on to the hook shank without contacting the weed guard 700. With this design as shown in FIG. 28-31, the arms 702 of the retaining member 752 hold the hook eye 704 in place by securing the hook eye 704 on either side of the weed guard 700. Wire or fiber weed guards have to be made thin and flexible in order to compress when struck by a fish, but this makes them prone to bending or breaking after several fish are hooked. Rather than replacing an entire weedless jig head, an angler only needs to replace a weedless hook When a hook eye is moved when the lure is in use, friction may cause wear on a soft, castable metal support post of the carriage member the pliable main body 22. An example is shown in FIG. 28-29 to alleviate some of this friction problem. In addition to the hook only being pressed against a surface of support post, this example 22f is retained against longitudinal and transverse movement by a hook, bend, or protrusion 704 specifically bent downward along the shank 40f to fit into a preformed groove 706 along the top of the soft body's head 120f. This specially bent hook 32f also helps eliminate the previously discussed fishing line entrapment problem wherein the line is prohibited from sliding past the hook bend 704.

It should be noted that the size, shape, and dimensions of the carriage assemblies 24a, 24b, 24c, 24d, 24e, 24f are independent of the size, shape, and dimensions of the body members 22a, 22c, 22d, 22e, 22f described above. That is, the carriage assemblies 24a-22f may be used with a wide range of shapes, types, and sizes of body members.

As generally discussed above, the body members 22a, 22c, 22d, and 22e may be molded of a supple elastomeric material, such as lure plastisol, rubber, organic materials, or silicone and combinations thereof. The resiliency of the material allows material to be deformed by finger pressure so that the carriage assemblies 24a, 24b, 24c, 24d, 24e, and 24f hooks 32, and lines 34 can be repeatedly inserted into and withdrawn from the respective carriage passageways without damage to the body member. Further, the body members 22a, 22c, and 22d are desirably composed of a homogeneous elastomer selected to provide a desired degree of suppleness to provide a swimming motion during normal use. A reinforcing membrane such as an open weave or mesh fabric may be cast into the body member 22a, 22c, or 22d aft of the head portion thereof. In the alternative or in combination with such a membrane, the body members 24a, 24c, and 24d may be molded of differing materials or formulations. For example, the head portion 120, tail portion 122, and baffle portion 126 of the body members 22a, 22c, or 22d may be cast of differing elastomer materials varying in hardness and with or without a reinforcing membrane.

As one example, any of the body members 22a, 22c, or 22d may be cast with a forward end of reinforcing membrane 800 or mesh arranged within a harder material forming the head portion 120 to anchor the head portion 120 to more flexible regions along a longitudinal length rearward of the carriage member. The harder material may extend rearward from the head portion 120 along the dorsal and ventral edges of the body member 22a, 22c, or 22d to provide additional strength along the longitudinal axis a, but these portions of the body members 22a, 22c, or 22d are thin enough to have little adverse impact on flexibility.

The baffle may be made of harder material to provide strength to the aft portion of the lure system 20 which is most susceptible to damage from striking fish. Additionally, being less flexible, the baffle stiffens the baffle portion 124 and creates greater drag for more powerful thrusting.

A material molded from a softer, and thus more flexible elastomer may be cast around the mesh in the middle portions or tail portion 122 along the longitudinal length thereof, creating a more flexible middle region for more lifelike or realistic swimming mechanics.

In addition, a vertical rib of harder material may be included near the body midpoint to stiffen that region and link the dorsal and ventral edges (both of harder elastomer) of the body member. If utilized, the vertical rib also creates a predetermined flex zone.

The membrane 800 is preferably an open weave polyester such as mosquito netting. Polyester is preferred because it is inexpensive, sheer, strong, and water resistant. An open-weave material 800 allows the elastomer to bond firmly between the openings in the netting. Before casting supple material around the mesh, a primer layer is applied to improve adhesion to the mesh. The preferred primer is water soluble fabric adhesive, such as those found in screen printing inks and adhesives. Such material is inexpensive, non-toxic, and has great penetration into fabric threads, which substantially increases surface area for bonding between the membrane and elastomeric plastisol. Membrane 800 may be colored or patterned to represent the appearance of a particular baitfish; when a clear elastomer, such as lure plastisol, is cast around the patterned mesh, the colors and patterns show through.

A "hinge" zone 802, defined as the smallest transverse cross section area along the tail portion 122 between the head portion 120 and the baffle portion 124 may be formed to facilitate realistic movement. If used, the hinge zone is best positioned in the forward seventy percent of the lure.

The baffle portion 124 typically has the largest transverse cross section area of any point of the body member 22. Typically the cross-section of the baffle portion is more than three times the size of any of the transverse cross section areas between thirty to fifty percent of longitudinal length forward of the point at which the tail portion 122 connects to the baffle portion 124.

For streamlining and minimizing pitch and roll, no transverse cross section area along the body longitudinal length should be larger than the transverse cross section area of the baffle portion 124.

The fishing lure system 20 thus may be embodied as a weighted, supple, flexible swimbait-type fishing lure fitted with structures that position a hook outside the contours of a supple body component and facilitate changing or replacing hooks, weights, and bodies in the field without tools. By keeping the hook outside the soft body member, the hook will not tear the body which may necessitate its replacement.

The two-part lure of the present invention may further include a flexible, elastomeric body 22 and a weighted carriage component 24 which is inserted into a conforming, preformed cavity positioned in the anterior (forward) end of the body. Weighted herein defined as made of a material more dense than water (1 gm/cm3). Having no hooks inside the body's forward end permits a reduced volume of elastomer in the head region 120 thereby resulting in a more streamlined lure which is far less prone to pitch and roll than known in the art. In addition, the reduction in pitch and roll results in a reduced amount of weight (ballast) to stabilize the inventive lure vertically when it is pulled through water.

Hooks, bodies and weights may all be separately replaceable in the fishing lure system 20, so the angler does not have to dispose of a weight along with a flawed hook. The lure may be manufactured in two castings, one for supple bodies 22 and one for the weighted carriage assembly 24.

The preferred embodiment is a swimbait imitating a fish, but the carriage construction may be used in other soft-bodied creature imitations, such as salamanders, crayfish and the like.

With no hook impaled into or otherwise secured inside the elastomeric body as is common in the known prior art, a longer rearward distance along the body's longitudinal length is available for arranging volumes or materials or formulations of different density or hardness to create predetermined flexing zones that result in hydrodynamic mechanics similar to the swimming motions of living fish.

Muscle flexing in most baitfish starts near the body midpoint and continues in a sinusoidal wave with increasing amplitude which sheds counter-rotating vortices moving support posteriorly.

In the lure system disclosed herein, lifelike flexing is produced by an oversized baffle 124 working synergistically with lower volumes or differential hardness in the lure's mid-section 122 to produce flexing originating near the body mid-point. The lure's flexing increases in amplitude as the flex moves rearward, resulting in pre-determined tailbeats, amplitude, and vortex formation similar to a live fish.

In some embodiments of the disclosed apparatus, a strong reinforcing vertically oriented membrane 800 is molded into the body longitudinally along the lure backbone axis to give strength to the supple material. The membrane is particularly useful as reinforcement in body lengths or zones along the longitudinal length having low volume or low hardness (heterogeneous sections of high flexibility). The membrane 800 may serve as a substrate for securely positioning heterogeneous materials or formulations adjacent to each other along the body's longitudinal length for varying flexibility and swimming mechanics.

Advantages of the inventive configuration include low cost of manufacturing the flexible softbait body component. In addition, the carriage casting may be universal for a wide range of lure body configurations and differing body flexibility and differing locations of the flex zones or hinges 802 along the rearward ⅔ of the body length. In addition, the more streamlined lure shape results in a lesser amount of elastomer needed to cast the body, resulting in cost savings. The body, having no embedded hook may have a lower volume and weight, resulting in lower costs.

The fishing lure system 20 may thus be embodied as a two-part fishing lure having a replaceable hook-retainer carriage assembly 24 removably insertable in an elastomeric body component 22. When configured as a two-part lure, the fishing lure may be configured with a flexible elastomeric body component 22a with a precisely positioned preformed cavity 132 in the head region 120 for receiving a weighted hook-retainer carriage assembly 24. The carriage assembly 24 may be inserted into the lure through a slit or passageway 126 connected to the cavity 132. The elastomeric bodies 22, hooks 32 and weighted carriage assemblies 24 of one example are independently removable and replaceable. The carriage assembly 24 of one example includes an integral hook eye retaining loop and hook shank retainers which exit through passageways from the preformed cavity to the dorsal surface of the elastomeric body. The eyelet and retainers may be configured to position an upward pointing hook 32 that is removably secured adjacent the outside dorsal surface of the lure so that the hook is struck (locked) inside of the shear zone inside the bite volume, while the softer body member is released from the hook and this outside the "shear zone", i.e., outside the bite volume of the fish's mouth avoiding damage. In contrast, soft swimbaits having a hook positioned within an elastomer body results in the hook being trapped in the fish's mouth sheer zone, leading to significantly damaged lures each time there is a strike.

Further, the lure system 20 as disclosed herein may be configured such that a hook 32 is not attached directly to the lure 22 but is tied to the fishing line 34 only. A spring wire loop or retaining member 152 may be formed so that the fishing line 34 and knot 50 will freely pass through, but a horizontal hook eye 42 has too large a diameter to pass through the retaining member 152.

In one example, spring wires are formed to maintain a hook shank 40 in axial alignment with the lure's backbone axis A. When a predator fish strikes the lure and engages the hook 32, the hook 32 is released from the carriage assembly 24, and the lure 20 (body member 22 and carriage assembly 24) slides down the line 34 away from the hook 32, avoiding potential damage of the body member 22 from being inside the shear zone inside the fish's mouth.

The hook eye 42 and hook shank 40 retainers 152 of the carriage assembly 24 exit the soft body through passageways 126, 134 from the preformed cavity 132 to the dorsal or ventral surface of the elastomeric body 22. Once inserted into body, a fishing line 34 is passed through a closed wire loop or retaining member 152 in the carriage 24 and tied to a horizontal eyed fish hook 32. In one example, the closed wire loop 152 exits the carriage with a pair of vertical posts that have a smaller distance in the opening between them than the outside diameter of the hook eye which prevents a horizontal hook eye from being pulled through. The closed wire loop is bent horizontally rearward and downward to form a gap between the wire loop and the top of the carriage at a distance that will keep the horizontal hook eye essentially flat against the lure and prevent the hook shank and point from coming out of vertical alignment against the backbone axis and keeping the hook eye adjacent to the dorsal or ventral surface of the lure body.

The carriage may be cast with wire configurations to hold both hook eye 42 and hook shank 40 in a position where the hook is maintained in alignment with the backbone axis adjacent to the dorsal surface of the lure. Elastomeric bodies, hooks and weights are all removable and replaceable. The hook eyelet and shank retainers are configured to position a hook adjacent to the dorsal surface of a lure body. A hook eye 42 is captured by securing fishing line to a hook eye and pulling the line forward into the hook eye and hook shank retaining wires. When a fish grabs the hook, the hook 32 is released from the carriage and body with the hook staying inside the "sheer zone" between the fish's teeth while the released lure body avoids damage.

Where a fishing line 34 is secured to the hook eye 42, hook replacement is accomplished by cutting the line 34 and tying on a new hook at its eye 42.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept. The invention illustratively disclosed herein suitably may be practiced in the absence of any element which is not specifically disclosed herein.

The invention claimed is:

1. A fishing lure system comprising:
    an elastomeric body member having a receiving cavity formed therein;
    an internal surface of the body member forming a cavity having a carriage passageway with a first opening, a central portion;
    a weighted carriage assembly removably positioned in the central portion;

the carriage assembly comprising a distal surface, a retaining member protruding from the distal surface and protruding from the central portion;

a fishing hook having an eye removably pressed between the retaining member and the distal surface;

a fishing line passing through the retaining member and connected to the fishing hook eye; and wherein the fishing hook eye is prohibited from passing through the retaining member.

2. The fishing lure system as recited in claim 1 further comprising a detent surface knot channel in the distal surface.

3. The fishing lure system as recited in claim 1, the carriage assembly further comprising:

a support post protruding from a base;

the distal surface of the carriage assembly on the support post;

the retaining member protruding through a second opening of the internal surface of the body member, the second opening in opposition to the first opening.

4. The fishing lure system as recited in claim 1, the body member having a hardness as measured by a shore durometer test of between 15 and 50.

5. The fishing lure system as recited in claim 1 comprising a hook groove in the body member configured to retain and align the fishing hook.

6. The fishing lure system as recited in claim 1, wherein portions of the internal surface of the body member are a negative image of the contacting surfaces of the carriage assembly to fit therein with no gaps therebetween.

7. The fishing lure system as recited in claim 1 further wherein the entire fishing hook is external to the body member.

8. The fishing lure system as recited in claim 1 comprising a surface defining a fishing line guide through the carriage member.

9. The fishing lure system as recited in claim 1 comprising a hinge zone located in the forward one-half of the elastomeric body.

10. The fishing lure system as recited in claim 9, the hinge zone measured from where a forward portion of a baffle joins the elastomeric body to a forward end of the elastomeric body.

* * * * *